US009959427B2

(12) United States Patent
Mikami et al.

(10) Patent No.: US 9,959,427 B2
(45) Date of Patent: May 1, 2018

(54) INFORMATION DETERMINATION APPARATUS, INFORMATION DETERMINATION METHOD AND RECORDING MEDIUM

(71) Applicant: NEC Corporation, Minato-ku, Tokyo (JP)

(72) Inventors: Sawako Mikami, Tokyo (JP); Kenichiro Fujiyama, Tokyo (JP); Kentaro Yamasaki, Tokyo (JP); Yuji Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 15/114,616

(22) PCT Filed: Apr. 14, 2015

(86) PCT No.: PCT/JP2015/000135
§ 371 (c)(1),
(2) Date: Jul. 27, 2016

(87) PCT Pub. No.: WO2015/118801
PCT Pub. Date: Aug. 13, 2015

(65) Prior Publication Data
US 2016/0350557 A1 Dec. 1, 2016

(30) Foreign Application Priority Data

Feb. 4, 2014 (JP) .................................. 2014-019439

(51) Int. Cl.
*G06F 21/78* (2013.01)
*G06F 21/62* (2013.01)
(Continued)

(52) U.S. Cl.
CPC .... *G06F 21/6254* (2013.01); *G06F 17/30339* (2013.01)

(58) Field of Classification Search
None
See application file for complete search history.

(56) References Cited

U.S. PATENT DOCUMENTS

2010/0162402 A1* 6/2010 Rachlin ............... G06F 21/6254
726/26
2011/0010563 A1* 1/2011 Lee ..................... G06F 21/6254
713/189

(Continued)

FOREIGN PATENT DOCUMENTS

JP 2013-41536 A 2/2013

OTHER PUBLICATIONS

"K-anonymity: a model for protecting privacy", Latanya Sweeney, International Journal on Uncertainty, Fuzziness and Knowledge-based Systems, vol. 10, No. 5, pp. 557-570, May 2002.

(Continued)

*Primary Examiner* — Venkat Perungavoor

(57) ABSTRACT

An information determination apparatus includes a first storage unit configured to store stream data pieces obtained in time sequence; a first determining unit configured to determine whether the number of stream data pieces stored in the first storage unit is at least equal to a predetermined value; and a second determining unit configured to determine, when the number of the stream data pieces stored in the first storage unit is equal to or greater than the predetermined value, whether an individual can be identified based on a dataset composed of a plurality of the stream data pieces stored in the first storage unit, and output the dataset used for the determination and the determination result.

9 Claims, 21 Drawing Sheets

(51) Int. Cl.
*G06F 17/30* (2006.01)
*G06F 12/14* (2006.01)

(56) References Cited

U.S. PATENT DOCUMENTS

| | | | | |
|---|---|---|---|---|
| 2011/0258206 A1* | 10/2011 | El Emam | G06F 21/577 | 707/754 |
| 2013/0269038 A1* | 10/2013 | Takahashi | H04L 9/32 | 726/26 |
| 2014/0006553 A1* | 1/2014 | Dambayashi | H04L 67/10 | 709/217 |
| 2014/0129628 A1* | 5/2014 | Fletcher | H04W 12/02 | 709/204 |
| 2014/0189858 A1* | 7/2014 | Chen | G06F 17/30289 | 726/22 |
| 2014/0281572 A1* | 9/2014 | Wang | G06F 21/6254 | 713/189 |

OTHER PUBLICATIONS

"Real-time k-anonymization for Trajectory Stream", Tsubasa Takahashi, Shin'ya Miyakawa, and Naoko Ito, [online], Jul. 27, 2011, The Institute of Electronics, Information and Communication Engineers, Data Kogaku Senmon Iinkai, Internet, <URL: http://db-event.jpn.org/deim2011/proceedings/pdf/c5-1.pdf>.

"An Architecture for Low-Latency Anonymizing Mechanism", Junichi Sawada, Koichi Inoue, and Hiroaki Nishi, IPSJ SIG Notes Heisei 22 Nendo 6 [DVD-ROM], Apr. 15, 2011, [ISSN] 1884-0930, pp. 309-314.

International Search Report for PCT Application No. PCT/JP2015/000135, dated Feb. 10, 2015.

English translation of Written opinion for PCT Application No. PCT/JP2015/000135.

\* cited by examiner

Fig. 4

| GENDER | AGE | OCCUPATION | POSITION | STATE | TIME |
|---|---|---|---|---|---|
| MALE | 22 | ENGINEER | (X1, Y1) | MOVING | t0 |

| NUMBER | GENDER | AGE | OCCUPATION | POSITION | STATE | TIME |
|---|---|---|---|---|---|---|
| — | — | — | — | — | — | — |

(b)

| NUMBER | GENDER | AGE | OCCUPATION | POSITION | STATE | TIME |
|---|---|---|---|---|---|---|
| D1 | MALE | 22 | ENGINEER | (X1, Y1) | MOVING | t0 |
| D2 | MALE | 27 | ENGINEER | (X2, Y2) | USING TERMINAL | t3 |

(c)

| NUMBER | GENDER | AGE | OCCUPATION | POSITION | STATE | TIME |
|---|---|---|---|---|---|---|
| D1 | MALE | 22 | ENGINEER | (X1, Y1) | MOVING | t0 |
| D2 | MALE | 27 | ENGINEER | (X2, Y2) | USING TERMINAL | t3 |
| D3 | MALE | 25 | ENGINEER | (X3, Y3) | FAST MOVING | t4 |

(d)

| NUMBER | GENDER | AGE | OCCUPATION | POSITION | STATE | TIME |
|---|---|---|---|---|---|---|
| — | MALE | 25 | ENGINEER | (X3, Y3) | FAST MOVING | t4 |

Fig. 8

| NUMBER | GENDER | AGE | OCCUPATION | POSITION | STATE | TIME |
|---|---|---|---|---|---|---|
| D1 | MALE | 22 | ENGINEER | (X1, Y1) | MOVING | t0 |
| D2 | MALE | 55 | ENGINEER | (X2, Y2) | USING TERMINAL | t3 |
| D3 | MALE | 29 | ENGINEER | (X3, Y3) | FAST MOVING | t4 |

Fig. 10

| QUASI-IDENTIFIER | CATEGORY |
|---|---|
| AGE | 10s: 10-19<br>20s: 20-29<br>... |
| OCCUPATION | SPECIALIST: ANNOUNCER, CURATOR,<br>          CRAM SCHOOL TEACHER, ...<br>TECHNICAL: ENGINEER, PHYSICIAN, ...<br>CLERICAL: CLERK, RECEPTIONIST, ...<br>SALES: SALES REP, ...<br>... |
| ... | ... |

Fig. 12

TIME T0

(a)

| NUMBER | ID | GENDER | AGE | POSITION | STATE | TIME |
|---|---|---|---|---|---|---|
| D1 | 001 | MALE | 22 | (X1, Y1) | STOPPED | t0 |
| D2 | 002 | MALE | 22 | (X2, Y2) | MOVING | t1 |
| D3 | 003 | MALE | 22 | (X3, Y3) | MOVING | t4 |

TIME T1

(b)

| NUMBER | ID | GENDER | AGE | POSITION | STATE | TIME |
|---|---|---|---|---|---|---|
| D1 | 001 | MALE | 22 | (X1, Y1) | MOVING | t5 |
| D4 | 004 | MALE | 22 | (X4, Y4) | MOVING | t8 |
| D5 | 005 | MALE | 22 | (X5, Y5) | STOPPED | t7 |

TIME T2

(c)

| NUMBER | ID | GENDER | AGE | POSITION | STATE | TIME |
|---|---|---|---|---|---|---|
| D1 | 001 | MALE | 22 | (X1, Y1) | MOVING | t9 |
| D6 | 006 | MALE | 22 | (X6, Y6) | MOVING | t11 |
| D7 | 007 | MALE | 22 | (X7, Y7) | FAST MOVING | t12 |

Fig. 13

TIME T0

(a)

| NUMBER | ID | GENDER | AGE | POSITION | STATE | TIME |
|---|---|---|---|---|---|---|
| D1 | 00A | MALE | 22 | (X1, Y1) | STOPPED | t0 |
| D2 | 00B | MALE | 22 | (X2, Y2) | MOVING | t1 |
| D3 | 00C | MALE | 22 | (X3, Y3) | MOVING | t4 |

TIME T1

(b)

| NUMBER | ID | GENDER | AGE | POSITION | STATE | TIME |
|---|---|---|---|---|---|---|
| D1 | 00A | MALE | 22 | (X1, Y1) | MOVING | t5 |
| D4 | 00D | MALE | 22 | (X4, Y4) | MOVING | t8 |
| D5 | 00E | MALE | 22 | (X5, Y5) | STOPPED | t7 |

TIME T2

(c)

| NUMBER | ID | GENDER | AGE | POSITION | STATE | TIME |
|---|---|---|---|---|---|---|
| D1 | 00A | MALE | 22 | (X1, Y1) | MOVING | t9 |
| D6 | 00F | MALE | 22 | (X6, Y6) | MOVING | t11 |
| D7 | 00G | MALE | 22 | (X7, Y7) | FAST MOVING | t12 |

| NUMBER | GENDER | AGE | OCCUPATION | POSITION | STATE | TIME |
|---|---|---|---|---|---|---|
| D1 | MALE | 22 | ENGINEER | (X1, Y1) | MOVING | t0 |
| D2 | MALE | 22 | ENGINEER | (X2, Y2) | USING TERMINAL | t3 |
| D3 | MALE | 22 | ENGINEER | (X3, Y3) | FAST MOVING | t4 |

(b)

| NUMBER | GENDER | AGE | OCCUPATION | POSITION | STATE | TIME |
|---|---|---|---|---|---|---|
| D1 | MALE | 22 | ENGINEER | (X1, Y1) | MOVING | t0 |
| D2 | MALE | 22 | ENGINEER | (X2, Y2) | USING TERMINAL | t3 |

| SERVICE ID | DATASET |
|---|---|
| S1 | {(DATA), (DATA), (DATA)} |
| S2 | {(DATA), (DATA)} |
| S3 | {(DATA), (DATA), (DATA)} |
| ... | ... |

Fig. 22

(a)
| DATA |
| --- |
| (AGE = 22, OCCUPATION = SYSTEM ENGINEER, DISEASE = COMMON COLD) |
| (AGE = 27, OCCUPATION = PROGRAMMER, DISEASE = CANCER) |
| (AGE = 25, OCCUPATION = SYSTEM ENGINEER, DISEASE = TUBERCULOSIS) |

(b)
| DATA |
| --- |
| (AGE = 20s, OCCUPATION = ENGINEER, DISEASE = COMMON COLD) |
| (AGE = 20s, OCCUPATION = ENGINEER, DISEASE = CANCER) |
| (AGE = 20s, OCCUPATION = ENGINEER, DISEASE = TUBERCULOSIS) |

INFORMATION DETERMINATION APPARATUS, INFORMATION DETERMINATION METHOD AND RECORDING MEDIUM

This application is a National Stage Entry of PCT/JP2015/000135 filed on Jan. 14, 2015, which claims priority from Japanese Patent Application 2014-019439 filed on Feb. 4, 2014, the contents of all of which are incorporated herein by reference, in their entirety.

TECHNICAL FIELD

The present invention relates to an information determination apparatus, an information determination method, and a recording medium. In particular, the present invention relates to an information determination apparatus, an information determination method, and a recording medium, which are for determining whether an individual can be identified from a collection of data.

BACKGROUND ART

In recent years, various personal information has been accumulated and services based on such accumulated data have become more widespread. Various personal information being collected includes, for example, purchased products managed by integrated circuit (IC) tags, positional information about mobile terminals based on global positioning system (GPS) signals, postings to social media, history of Web site searches, and history of product purchases at online stores. The collected personal information is utilized for such services as offering consumers commodities in which they may be interested. In the following descriptions, a data generating apparatus such as a smartphone is denoted as a source.

For providing services based on the data collected from sources, it is necessary to develop an application for implementing such services. Some applications may be developed by telecommunications carriers permitting mobile terminals to use communication networks or online shopping operators. Alternatively other applications may be developed by external contractors. Or, some business operators buy personal information from data holders such as telecommunications carriers and provide their own services using such personal information. In other words, the entity collecting the personal information is not always the entity utilizing the personal information. This causes transfer of the personal information between the data holder and a data user. In such cases, it is necessary to prevent the individuals (source holders) who have provided information to the data holder from being identified based on the data provided to the data user and to prevent personal privacy information from being divulged.

NPL 1 discloses an anonymization technique, what is called k-anonymization. If the number of sensitive information pieces having the same quasi-identifier is less than k (where k is an integer equal to or greater than 2, which applies throughout the following), anonymizing the quasi-identifier with the technique called k-anonymization guarantees that the number of sensitive information pieces having the same quasi-identifier is at least k. A quasi-identifier refers to an attribute that allows for inference of a secret attribute when combined with another value. In other words, a quasi-identifier is different from an identifier that uniquely identifies a user, but represents information that provides possibility to distinguish the user (identify the user) when background information or the like is taken into consideration. Examples of a quasi-identifier may include gender, age, and occupation. Sensitive information means personal information that an individual wants to be undisclosed to others. Examples of sensitive information may include an individual's hobby and disease.

The following describes an example of k-anonymization by referring to FIG. 22. In FIG. 22, Age and Occupation are quasi-identifiers while Disease represents sensitive information, with the assumption that k is equal to 3. In (a) of FIG. 22, information prior to anonymization is shown concerning age, occupation, and disease of patients. In (b) of FIG. 22, information produced through anonymization is shown concerning age, occupation, and disease of the patients. Each of the three data pieces in (a) of FIG. 22 has its own age and occupation, and thus the fact that a 27-year-old programmer has cancer is known. Accordingly, a person who knows the age (27) and occupation (programmer) may possibly identify the patient.

In such cases, the operation called k-anonymization is used to generalize the quasi-identifiers, namely age and occupation.

Specifically, as illustrated in (b) of FIG. 22, a common age and occupation are shared by the patients to represent that there are k (specifically 3 here) patients having the same age and occupation, and thus a person who knows the age and occupation of a patient cannot identify the exact disease of the patient. In this way, guaranteeing k-anonymity makes the probability of identifying an individual 1/k or less.

CITATION LIST

Non Patent Literature

NPL 1: L. Sweeney, "k-anonymity: a model for protecting privacy", International Journal on Uncertainty, Fuzziness and Knowledge-based Systems, vol. 10, No. 5, pp. 557-570, 2002.

SUMMARY OF INVENTION

Technical Problem

The disclosure of the related literature given above is incorporated by reference herein. The following analysis has been made by the Inventors.

Anonymization processes such as aforementioned k-anonymization assume that target data has been collected by the data holder over a certain extended period. Specifically, an anonymization process is usually performed on a large amount of data stored in a hard disk, such as positional information or purchase history measured or obtained over a period of several days to several years. The data required by the application developer is extracted from such a huge amount of accumulated data with a frequency (for example, from every several days to every several months) predetermined between the parties (the data holder and the application developer) and used for the application development.

Accordingly, the application developer will also be provided with a huge amount of data. Under such circumstances, an anonymization process is carried out when it is determined that an individual can be identified from the extracted data (the data supplied to the application developer). Meanwhile, the advance of network and other technologies has created a greater need for services based on momently changing stream data (for example, consumers' positional information). In other words, the stream data supplied from sources needs to be processed in real time.

Since such stream data also contains personal information, some anonymization process is needed if an individual can be identified from the stream data. However, stream data may not have an enough amount of data for an anonymization process (for example, k-anonymization) because stream data is momently changing and periodically added.

Supposing that the stream data contains positional information that has been stored over a period ranging from several days to several months, and that such stream data is anonymized and provided to the application developer, the likelihood that individuals are uniquely identified can be significantly reduced. However, services based on positional information are valuable in that they process stream data in real time and provide timely information suitable for the current position of a consumer. In other words, it is not acceptable to anonymize the stream data that has been stored over a long period of time. Hence, there is a desire to have an information determination apparatus for determining whether individuals can be identified from momently emerging stream data and for causing an anonymization apparatus to perform an appropriate anonymization process.

An object of the present invention is to provide, in regard to momently added stream data, an information determination apparatus, an information determination method, and a recording medium that contribute to determining whether an individual can be identified from such stream data.

Solution to Problem

An information determination apparatus according to first aspect of the present invention is provided, which includes: first storage means for storing stream data pieces obtained in time sequence; first determining means for determining whether the number of stream data pieces stored in the first storage means is at least equal to a predetermined value; and second determining means for determining, when the number of the stream data pieces stored in the first storage means is equal to or greater than the predetermined value, whether an individual can be identified based on a dataset composed of a plurality of the stream data pieces stored in the first storage means, and outputting the dataset used for the determination and the determination result.

An information determination method according to second aspect of the present invention is provided, which includes: storing stream data pieces obtained in time sequence; making a first determination as to whether the number of the stored stream data pieces is at least equal to a predetermined value; when the number of the stored stream data pieces is equal to or greater than a predetermined value, making a second determination as to whether an individual is identified based on a dataset composed of a plurality of the stored stream data pieces; and outputting the dataset used for the second determination and a determination result.

A computer-readable recording medium according to third aspect of the present invention is provided, and records a program that causes a computer disposed in an information determination apparatus to execute the processes of: storing stream data pieces obtained in time sequence; making a first determination as to whether the number of the stored stream data pieces is at least equal to a predetermined value; when the number of the stored stream data pieces is equal to or greater than a predetermined value, making a second determination as to whether an individual is identified based on a dataset composed of a plurality of the stored stream data pieces; and outputting the dataset used for the second determination and a determination result.

A computer program recorded in the computer-readable storage medium is also included in the scope of the present invention. The storage medium may be a non-transient medium such as semiconductor memory, a hard disk, a magnetic recording medium, or an optical recording medium. The present invention can also be embodied in a computer program product.

Advantageous Effects of Invention

According to individual aspects of the present invention, there is provided, in regard to momently added stream data, an information determination apparatus, an information determination method, and a recording medium that contribute to determining whether an individual can be identified from such stream data.

BRIEF DESCRIPTION OF DRAWINGS

FIG. 4 illustrates an example stream data piece transmitted from a mobile terminal.

FIG. 5 illustrates an example of stream data pieces stored in a data storage unit.

FIG. 8 illustrates an example of a dataset transmitted by the information determination apparatus according to the first exemplary embodiment.

FIG. 10 illustrates an example of quasi-identifiers and their categorizations held in a quasi-identifier storage unit.

FIG. 12 illustrates an example of a plurality of datasets.

FIG. 13 illustrates an example of a plurality of datasets.

FIG. 17 illustrates an example of datasets transmitted from the information determination apparatus.

FIG. 22 is an explanatory diagram illustrating k-anonymization.

DESCRIPTION OF EMBODIMENTS

In the first place, an overview of one exemplary embodiment is described with reference to FIG. 1. It should be noted that drawing reference symbols for the overview are added for convenience to respective elements as an example to aid in understanding, and that no limitation is intended in descriptions of the overview.

As described above, there is a desire to have an information determination apparatus that contributes to determining, in regard to momently added stream data, whether an individual can be identified from such stream data.

Figure 1:
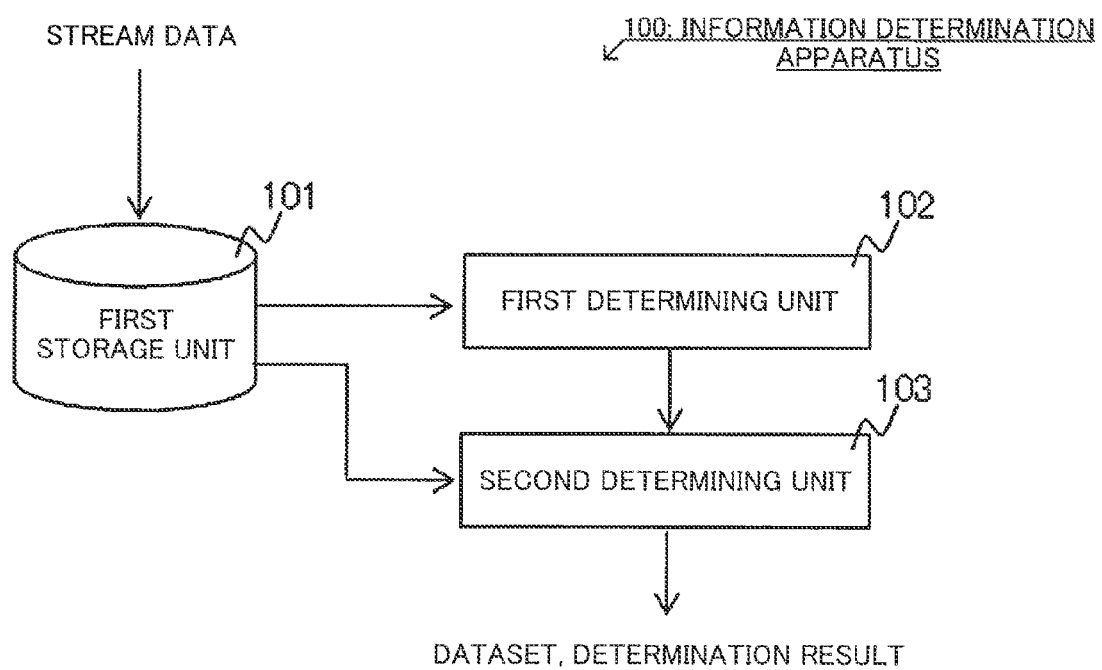
FIG. 1 is an explanatory diagram illustrating an overview of one exemplary embodiment.

To fulfill the desire, an information determination apparatus 100 is provided as illustrated in FIG. 1 by way of example. The information determination apparatus 100 includes a first storage unit 101, a first determining unit 102, and a second determining unit 103. The first storage unit 101 stores stream data that is obtained by the information processing apparatus 100 in time sequence. The first determining unit 102 determines whether the number of stream data pieces stored in the first storage unit 101 is at least equal to a predetermined value. When the number of stream data pieces stored in the first storage unit 101 is equal to or greater than the predetermined value, the second determining unit 103 determines whether an individual is identified based on the dataset composed of a plurality of stream data pieces stored in the first storage unit 101. Then, the second determining unit 103 outputs the dataset on which the determination has been made as to whether an individual is identified, along with the determination result.

The information determination apparatus 100 determines (in the first determining unit 102) whether the first storage unit 101 contains a minimum number of stream data pieces needed for anonymizing in the anonymization apparatus. The first determining unit 102 determines whether the stream data is buffered in about the number of pieces enough for the anonymization apparatus to perform an anonymization process. The determination prevents any stream data whose amount is too small for the anonymization apparatus to perform an anonymization process from being transmitted to the anonymization apparatus. This assures an anonymization process performed on momently added stream data. Once the number of buffered stream data pieces is equal to or greater than a predetermined value, the information determination apparatus 100 determines (in the second determining unit 103) whether the dataset to be transmitted to the anonymization apparatus includes any stream data from which an individual can be identified. Consequently, there is provided an information determination apparatus that can determine whether an individual can be identified from momently added stream data.

Specific exemplary embodiments will now be described in more detail with reference to the drawings.

First Exemplary Embodiment

A first exemplary embodiment will now be described in detail with reference to the drawings.

Figure 2:
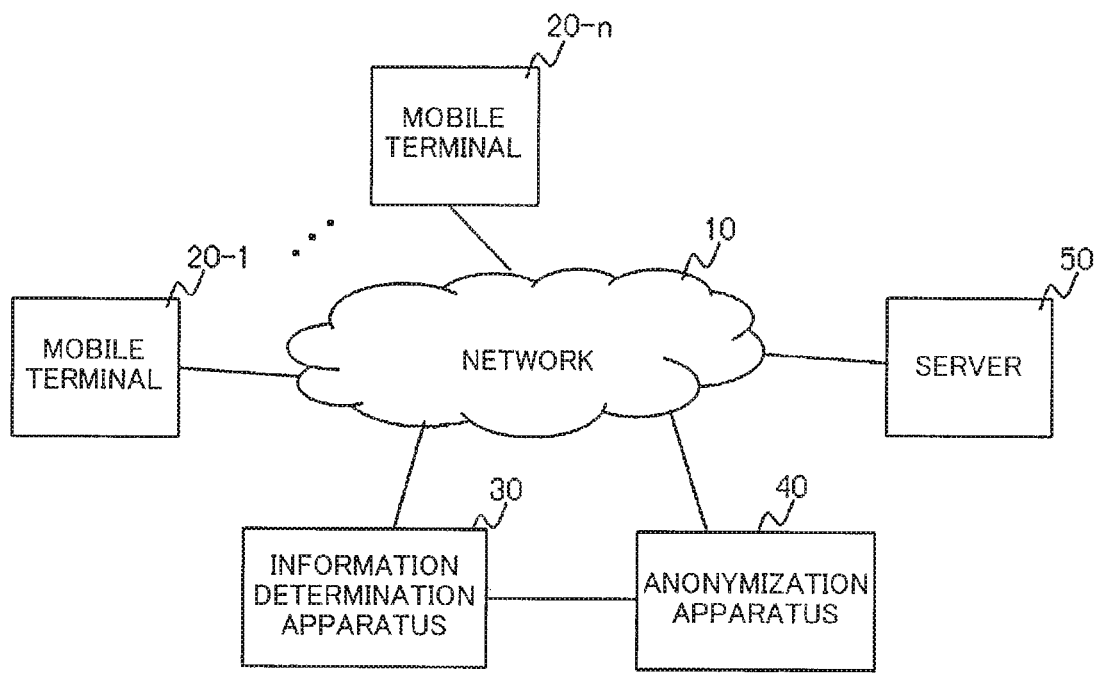
FIG. 2 illustrates an example configuration of a data processing system according to a first exemplary embodiment.

FIG. 2 illustrates an example configuration of a data processing system according to a first exemplary embodiment. With reference to FIG. 2, the data processing system is configured to include a network 10, a plurality of mobile terminals 20-1 to 20-$n$ (where n is an integer equal to or greater than 2, which applies throughout the following), an information determination apparatus 30, an anonymization apparatus 40, and a server 50. The mobile terminals 20-1 to 20-$n$ are hereinafter simply denoted as "mobile terminal 20" unless individually identified for any reason.

The terminals and individual apparatuses illustrated in FIG. 2 are connected to one another via the network 10. In the data processing system illustrated in FIG. 2, stream data is transmitted from mobile terminals 20 toward the server 50, undergoes information processing in the server 50, and is returned to mobile terminals 20, so that information providing services and the like are provided to users. The stream data transmitted from a mobile terminal 20 is captured into the information determination apparatus 30.

The information determination apparatus 30 determines whether an individual can be identified from the stream data (received data), and then transmits the determination result along with the received data to the anonymization apparatus 40. According to the present exemplary embodiment, the determination result transmitted from the information determination apparatus 30 to the anonymization apparatus 40 is either "identifiable", which represents the determination that an individual can be identified from the received data, or "non-identifiable", which represents the determination that an individual cannot be identified.

When the given determination result is "identifiable", the anonymization apparatus 40 performs an anonymization process on the received data and transmits the resulting data to the server 50. On the other hand, when the given determination result is "non-identifiable", the anonymization apparatus 40 transmits the received data to the server 50 without performing any anonymization process.

Stream data transmitted by the mobile terminal 20 includes positional information that is momently changing and added depending on the position of the mobile terminal 20. Thus, the mobile terminal 20 is an apparatus (source) transmitting the stream data. However, the intent is not to limit to the cases where stream data transmitted by the mobile terminal 20 includes positional information. Stream data transmitted by the mobile terminal 20 may include, for example, biometric information (such as pulse rate) from the user of the mobile terminal 20.

As seen above, the information determination apparatus 30 illustrated in FIG. 2 determines whether an individual can be identified from the stream data transmitted by the mobile terminal 20, and notifies the anonymization apparatus 40 of the determination result.

Figure 3:
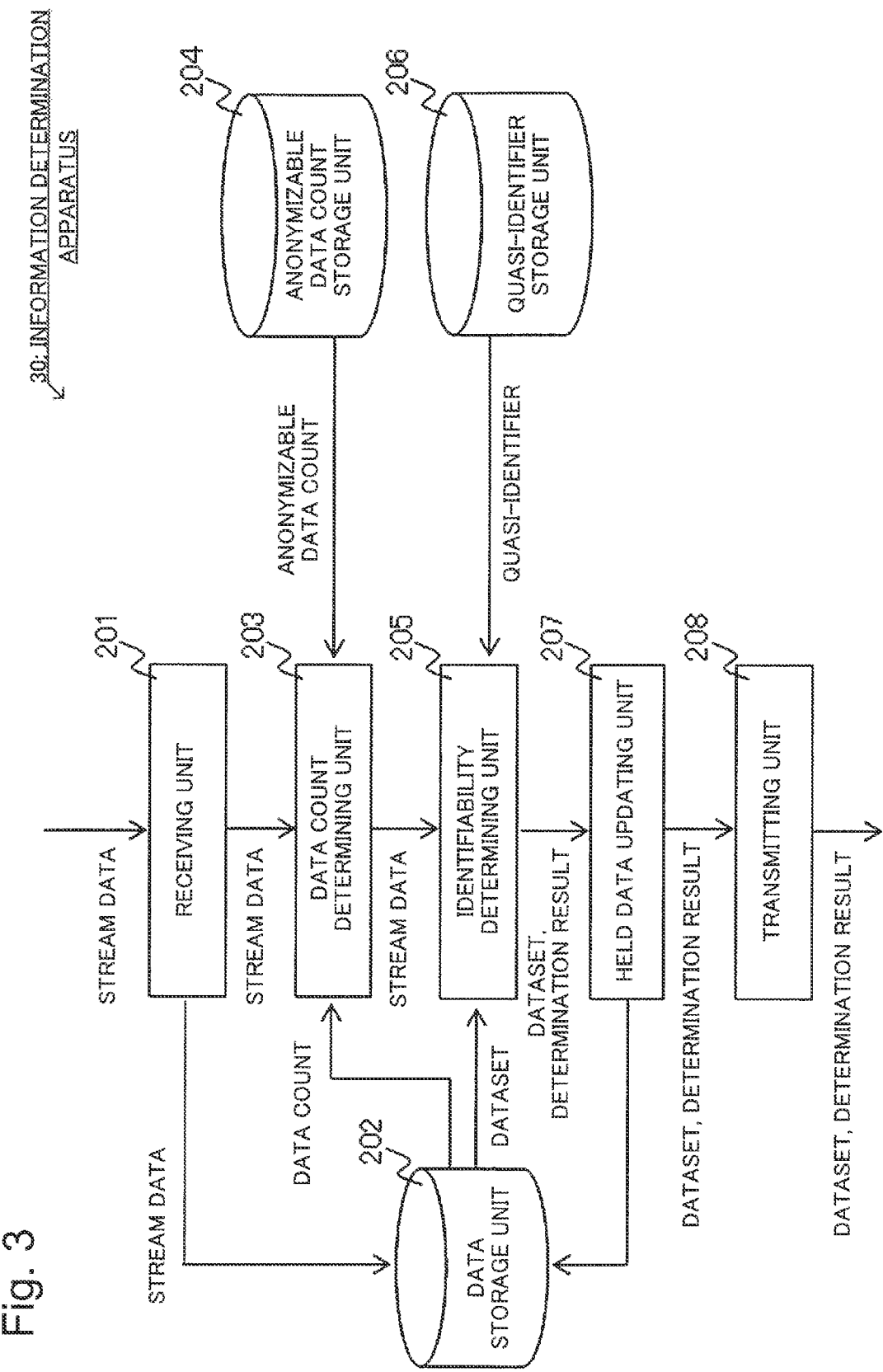
FIG. 3 illustrates an example internal configuration of an information determination apparatus according to the first exemplary embodiment.

FIG. 3 illustrates an example internal configuration of the information determination apparatus 30. With reference to FIG. 3, the information determination apparatus 30 is configured to include a receiving unit 201, a data storage unit (first storage unit) 202, a data count determining unit (first determining unit) 203, an anonymizable data count storage unit 204, an identifiability determining unit (second determining unit) 205, a quasi-identifier storage unit 206, a held data updating unit 207, and a transmitting unit 208.

The receiving unit 201 receives stream data transmitted by the mobile terminal 20. The receiving unit 201 is also a means for storing the received stream data (which may be hereinafter called received data) into the data storage unit 202. That is, the receiving unit 201 obtains stream data in time sequence transmitted by mobile terminals 20. In addition, the receiving unit 201 delivers the received data to the data count determining unit 203.

As described above, the data transmitted by the mobile terminal 20 is stream data that includes information about the mobile terminal 20, i.e., a source, information about the user of the mobile terminal 20 (the holder of the source), information obtained through calculation on measurements taken by the mobile terminal 20, and other information. Information about the mobile terminal 20 may include, for example, the type or model name of the mobile terminal. Information about the user of the mobile terminal 20 (the holder of the source) may include, for example, the user's age and occupation. Information obtained through calculation on measurements taken by the mobile terminal 20 may include, for example, positional information, the time when the data was obtained, and how the user is operating the terminal or the state of the user. Stream data transmitted by the mobile terminal 20 includes at least one piece of information (which may be simply called data) classified into a quasi-identifier, which in combination with another value may allow for identification of an individual.

FIG. 4 illustrates an example of stream data transmitted by a mobile terminal 20. The stream data illustrated in FIG. 4 includes the gender, age, and occupation, which represent information about the user, and the position, state (the user is moving), and time of the mobile terminal, which represent information obtained through calculation on measurements taken by the mobile terminal 20.

The data storage unit 202, which is configured to include a storage medium such as a hard disk, stores stream data. The data storage unit 202 is initially in the state of storing no storage data (holding 0 pieces of stream data), as illustrated in (a) of FIG. 5. The data storage unit 202 updates the table and database that manage received data (see (b) and (c) of FIG. 5) every time the data storage unit 202 obtains received data from the receiving unit 201.

Note that a collection of stream data pieces that the information determination apparatus 30 receives from a mobile terminal 20 is hereinafter denoted as a dataset. For example, (c) of FIG. 5 illustrates a dataset composed of three stream data pieces (D1 to D3). Also note that the items under "Number" in FIG. 5 and subsequent drawings are added for convenience of description only, and are not included in any stream data transmitted by mobile terminals 20.

The data count determining unit 203 is a means for determining whether the number of stream data (received data) pieces stored in the data storage unit 202 is at least equal to a predetermined value. Specifically, the data count determining unit 203 compares the number of stream data pieces (hereinafter called data count) included in a dataset stored in the data storage unit 202 with the anonymizable data count stored in the anonymizable data count storage unit 204. When the data count obtained from the data storage unit 202 is equal to or greater than the anonymizable data count, the data count determining unit 203 delivers the stream data obtained from the receiving unit 201 to the identifiability determining unit 205. On the other hand, when the data count held in the data storage unit 202 is less than the anonymizable data count, the data count determining unit 203 does not perform any specific action.

The anonymizable data count, as used herein, refers to a value specified by the system administrator, which value is equal to or greater than the data count needed for the anonymization apparatus 40 to perform an anonymization process. Specifically, if the anonymization apparatus 40 performs k-anonymization and k is equal to 3, the system administrator specifies a value equal to or greater than 3 as the anonymizable data count.

The anonymizable data count storage unit 204 is a means for storing the anonymizable data count to be used by the data count determining unit 203.

The quasi-identifier storage unit 206 stores one or more quasi-identifiers. Quasi-identifiers stored in the quasi-identifier storage unit 206 are registered by the system administrator in advance. More specifically, the system administrator registers into the quasi-identifier storage unit 206 a quasi-identifier which he/she deems to be disadvantageous when the stream data transmitted by a mobile terminal 20 contains a matching data piece classified into the quasi-identifier. For example, with reference to FIG. 5, the system administrator will register "Age" into the quasi-identifier storage unit 206 if he/she determines that the owner of a mobile terminal 20 is highly likely to be identified when the owner matches the Age. Or, the system administrator will register "Age" and "Occupation" into the quasi-identifier storage unit 206 if he/she determines that an individual is highly likely to be identified when the individual matches both of the Age and the Occupation.

Although descriptions of the first exemplary embodiment assume that the data storage unit 202, the anonymizable data count storage unit 204, and the quasi-identifier storage unit 206 are each configured to be separate from one another, these units may be configured to be a single storage apparatus altogether, or may be configured in any combination.

The identifiability determining unit 205 is a means for determining whether an individual can be identified based on a dataset composed of a plurality of stream data pieces stored in the data storage unit 202, when the number of the stream data pieces stored in the data storage unit 202 is equal to or greater than the anonymizable data count. More specifically, triggered by obtaining stream data transmitted from the data count determining unit 203, the identifiability determining unit 205 determines whether an individual can be identified from the dataset held in the data storage unit 202 based on the quasi-identifier(s) held in the quasi-identifier storage unit 206.

The identifiability determining unit 205 obtains the dataset held in the data storage unit 202 and obtains the quasi-identifier(s) held in the quasi-identifier storage unit 206. The identifiability determining unit 205 determines that an individual will be identified when one or more data pieces are unmatched, while the data piece(s) being included in each stream data piece constituting the obtained dataset and the data piece(s) being classified into any of the quasi-identifier(s) obtained from the quasi-identifier storage unit 206. In other words, the identifiability determining unit 205 determines, among the data pieces that constitute the stream data constituting the dataset and that are classified into any of the quasi-identifier, whether the data pieces that are classified into a quasi-identifier corresponding to the one held in the quasi-identifier storage unit 206 are different from one another. When these data pieces are different from one another, the identifiability determining unit 205 then determines that the dataset includes a stream data piece from which an individual may possibly be identified. In other words, among data pieces that are included in the data constituting a dataset and that are classified into a quasi-identifier, as long as the data pieces that are classified into a quasi-identifier corresponding to the quasi-identifier held in the quasi-identifier storage unit 206 match one another, it is determined that the dataset does not include any stream data from which an individual may possibly be identified.

For example, with reference to the dataset composed of stream data pieces D1 to D3 in (c) of FIG. 5, supposing that the quasi-identifier "Age" is held in the quasi-identifier storage unit 206, then data values under "Age" in the stream data pieces D1 to D3 are different from one another. Thus, the identifiability determining unit 205 determines that the dataset includes a stream data piece from which an individual may possibly be identified. Or, supposing that the quasi-identifier "Gender" is held in the quasi-identifier storage unit 206, then the data values under "Gender" in the stream data pieces D1 to D3 are identical to one another. Thus, the identifiability determining unit 205 determines that the dataset does not include any stream data piece from which an individual may possibly be identified.

The identifiability determining unit 205 delivers to the held data updating unit 207 both the dataset that was obtained from the data storage unit 202 and was used for making the above-mentioned determination and the result of determination ("identifiable" or "non-identifiable) as to whether the dataset includes any stream data from which an individual can be identified. The identifiability determining unit 205 externally outputs both the dataset on which the determination was made and the determination result, through the held data updating unit 207 and the transmitting unit 208.

The held data updating unit 207 is a means for instructing the data storage unit 202 to delete a dataset corresponding to the dataset on which the determination was made so as to update what is stored in the data storage unit 202, upon obtaining both the dataset on which the determination was made and the determination result from the identifiability determining unit 205. Then, the held data updating unit 207 transmits both the dataset and determination result obtained from the identifiability determining unit 205 to the anonymization apparatus 40 through the transmitting unit 208.

The transmitting unit 208 is a means for transmitting to the anonymization apparatus 40 at least a dataset and a determination result.

Figure 6:
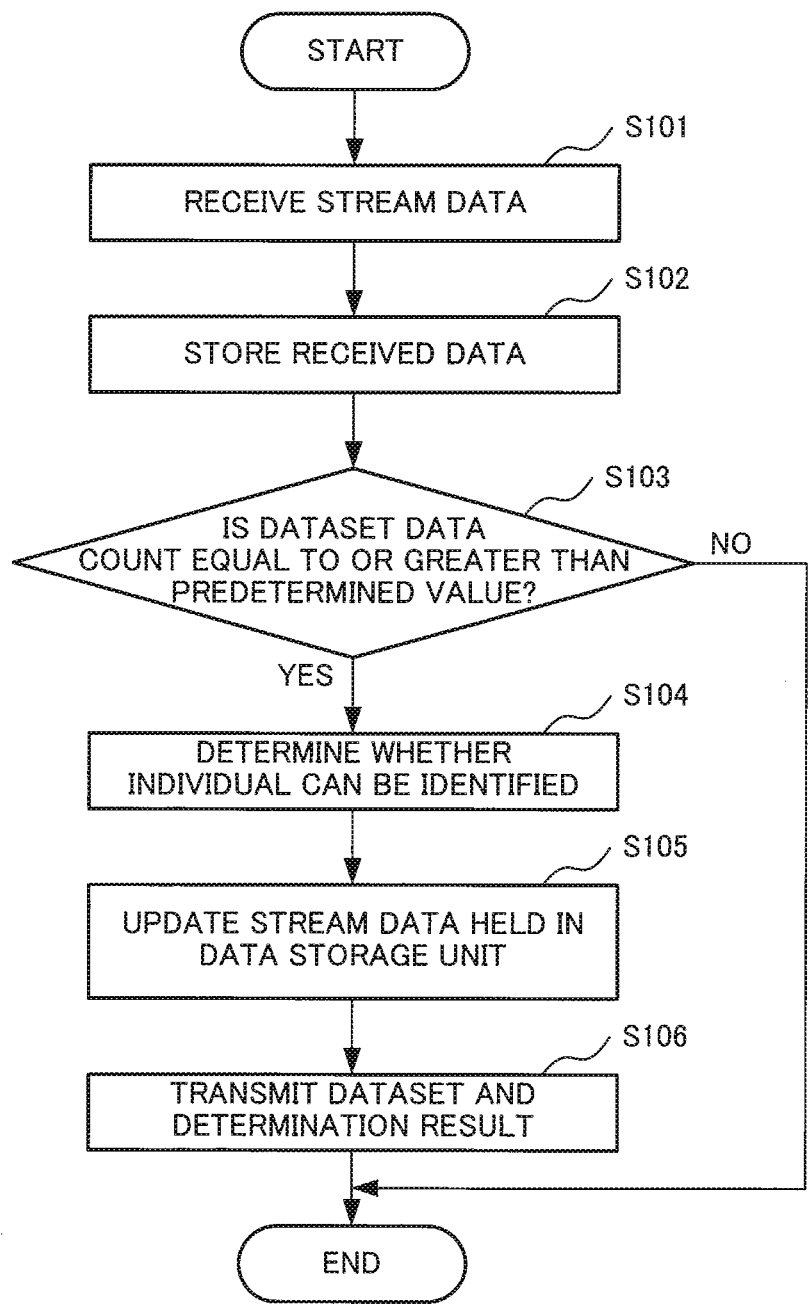
FIG. 6 is a flowchart illustrating example operations of the information determination apparatus according to the first exemplary embodiment.

Operations of the information determination apparatus 30 are outlined in the flowchart illustrated in FIG. 6.

In Step S101, the receiving unit 201 receives stream data from a mobile terminal 20. Then, the receiving unit 201 stores the received stream data (received data) into the data storage unit 202 (Step S102). In addition, the receiving unit 201 delivers the received stream data to the data count determining unit 203.

In Step S103, the data count determining unit 203 obtains the dataset held in the data storage unit 202 and compares the data count of the dataset with the anonymizable data count stored in the anonymizable data count storage unit 204.

When the comparison result represents that the data count of data included in the dataset is equal to or greater than the anonymizable data count (Yes branch in Step S103), the data count determining unit 203 delivers the stream data to the identifiability determining unit 205. On the other hand, when the comparison finds that the data count of data included in the dataset is less than the anonymizable data count (No branch in Step S103), the processing is ended.

In Step S104, the identifiability determining unit 205 determines, based on the dataset obtained from the data storage unit 202 and on the quasi-identifier(s) held in the quasi-identifier storage unit 206, whether an individual can be identified from the obtained dataset, and then generates a result of the determination. Next, the identifiability determining unit 205 delivers the obtained dataset along with the determination result to the held data updating unit 207.

In Step S105, the held data updating unit 207 instructs the data storage unit 202 to delete a dataset corresponding to the obtained dataset. Then, the held data updating unit 207 delivers the dataset and the determination result to the transmitting unit 208.

In Step S106, the transmitting unit 208 transmits the obtained dataset and the determination result to the anonymization apparatus 40, and then the processing is ended.

Figure 7:
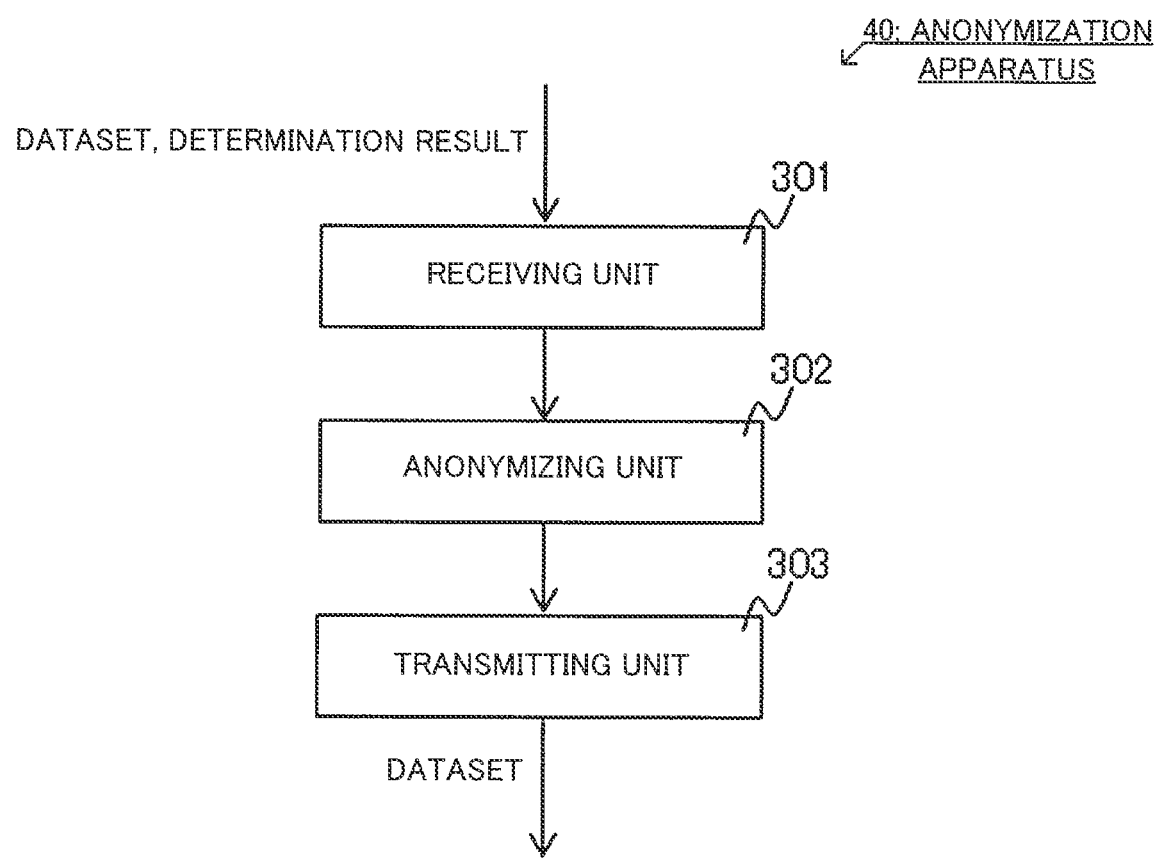
FIG. 7 illustrates an example internal configuration of an anonymization apparatus.

FIG. 7 illustrates an example internal configuration of the anonymization apparatus 40. With reference to FIG. 7, the anonymization apparatus 40 is configured to include a receiving unit 301, which receives at least a dataset and a determination result, an anonymizing unit 302, and a transmitting unit 303, which transmits the dataset that has gone through the anonymizing unit 302.

The anonymizing unit 302 performs an anonymization process on the received dataset by, for example, carrying out k-anonymization as disclosed in NPL 1. However, an anonymization process is not limited to the k-anonymization, and thus any other anonymizing method may be used. When the determination result received from the information determination apparatus 30 represents "identifiable", the anonymizing unit 302 performs the anonymization process. On the other hand, when the received determination result represents "non-identifiable", the anonymizing unit 302 delivers the dataset as it is to the transmitting unit 303 without performing any specific process.

Operations of the information determination apparatus 30 according to the first exemplary embodiment will now be described in detail with reference to FIGS. 5 and 6. It is assumed here that the anonymization apparatus 40 performs k-anonymization with k="3". Thus, the system administrator has already registered an anonymizable data count of "3" into the anonymizable data count storage unit 204 in the information determination apparatus 30. It should be noted that the anonymizable data count may be 3 or more because k-anonymization allows for anonymization of stream data as long as there are at least k pieces of stream data.

The system administrator has already registered "Age" and "Occupation" as quasi-identifiers held in the quasi-identifier storage unit 206. Additionally, it is assumed that the data storage unit 202 stores pieces of received data, each of which is configured to include the elements "Gender", "Age", "Occupation", "Position", "State", and "Time", as illustrated in FIG. 5. Furthermore, the following describes operations assuming that the data storage unit 202 already stores the dataset illustrated in (b) of FIG. 5. In such conditions, it is assumed that the receiving unit 201 has just received the stream data illustrated in (d) of FIG. 5.

Upon receipt of the stream data illustrated in (d) of FIG. 5 (Step S101 in FIG. 6), the receiving unit 201 stores the received data into the data storage unit 202 (Step S102). As a result, the data storage unit 202 stores the dataset as illustrated in (c) of FIG. 5. In addition, the receiving unit 201 delivers the stream data illustrated in (d) of FIG. 5 to the data count determining unit 203.

Upon obtaining the stream data ((d) of FIG. 5), the data count determining unit 203 obtains the data count of data included in the dataset from the data storage unit 202. Since the data count obtained from the data storage unit 202 is equal to or greater than the data count (that is to say "3", which is held in the anonymizable data count storage unit 204) needed for performing an anonymization process (Yes branch in Step S103), the data count determining unit 203 delivers the stream data ((d) of FIG. 5) to the identifiability determining unit 205. Upon obtaining the stream data ((d) of FIG. 5), the identifiability determining unit 205 obtains the dataset ((c) of FIG. 5) held in the data storage unit 202.

In the three stream data pieces included in the dataset obtained by the identifiability determining unit 205, the data pieces classified into the quasi-identifiers "Age" and "Occupation", which are held in the quasi-identifier storage unit 206, are different from one another. Thus, the identifiability determining unit 205 determines that the obtained dataset includes a stream data piece from which an individual can be uniquely identified (Step S104). The identifiability determining unit 205 generates a determination result representing "identifiable".

Then, the identifiability determining unit 205 delivers the dataset ((c) of FIG. 5) and the determination result representing "identifiable" to the held data updating unit 207. Upon obtaining the dataset ((c) of FIG. 5) and the determination result representing "identifiable", the held data updating unit 207 deletes the obtained dataset from the data storage unit 202 (Step S105). As a result, the data storage unit 202 now stores no stream data ((a) of FIG. 5).

Then, the held data updating unit 207 delivers the obtained dataset and the determination result representing "identifiable" to the transmitting unit 208. The transmitting unit 208 transmits the obtained dataset ((c) of FIG. 5) and the determination result representing "identifiable" to the anonymization apparatus 40 (Step S106).

As seen above, the information determination apparatus 30 according to the first exemplary embodiment determines whether the stream data is stored in the data storage unit 202 in at least the number of data pieces needed for the anonymization apparatus 40 to perform anonymization (a first determination). In other words, the information determination apparatus 30 determines whether the stream data is buffered (accumulated) in the number of data pieces enough for the anonymization apparatus 40 to perform an anonymization process. By making the first determination, the information determination apparatus 30 prevents the stream data whose amount is too small for the anonymization apparatus 40 to perform an anonymization process from being transmitted to the anonymization apparatus 40. At the same time, the information determination apparatus 30 buffers stream data in a minimum number of data pieces, and thus the real-time performance of services based on momently added stream data is not decreased. In other words, the information determination apparatus 30 makes the first determination to achieve both secure anonymization performed by the anonymization apparatus 40 and real-time information processing on stream data.

In addition, the information determination apparatus 30 determines whether the dataset to be transmitted to the anonymization apparatus 40 includes any stream data from which an individual may possibly be identified (a second determination). The information determination apparatus 30 transmits the result of the second determination to the anonymization apparatus 40. The anonymization apparatus 40 need only determine based on the determination result whether anonymization is necessary on the dataset, without performing anonymization on any dataset that does not need anonymization. This leads to a reduced burden on the anonymization apparatus 40 and a shorter processing time, and consequently to improved real-time performance of the information processing on stream data.

Second Exemplary Embodiment

A second exemplary embodiment will now be described in detail with reference to the drawings.

In the first exemplary embodiment, a determination is made as to whether an individual can be identified from a dataset when stream data is accumulated in the information determination apparatus 30 in at least a predetermined number of data pieces (anonymizable data count). However, even when there exist stream data in at least a predetermined data count, anonymization in the anonymization apparatus 40 may not be appropriate. As an example, it is assumed that the anonymizable data count held in the anonymizable data count storage unit 204 is 3 and that the dataset illustrated in FIG. 8 has been transmitted from the information determination apparatus 30. The anonymization apparatus 40 is going to perform k-anonymization based on k=3 and quasi-identifiers of "Age" and "Occupation".

The anonymization will result in excessive generalization like "Age=20 to 60" because the data pieces classified into the quasi-identifier "Age" have a wide range from 22 to 55. An excessively generalized dataset may be worthless to a business operator who is going to utilize the dataset. For example, supposing that items in which men are interested are significantly different between in their 20s and 50s and that the business operator provides information in different contents depending on the ages, then an excessively generalized dataset as above will be worthless to the operator.

Thus, the information determination apparatus 30a according to the second exemplary embodiment adjusts the data count handled in the identifiability determining unit 205, in order to decrease the likelihood of excessive generalization during an anonymization process performed by the anonymization apparatus 40. Whether a dataset is "worthless" or not depends on specific services that are provided based on the dataset, and thus the system administrator defines what dataset is meaningful (not worthless) taking into consideration the specific services and anonymization process.

Figure 9:
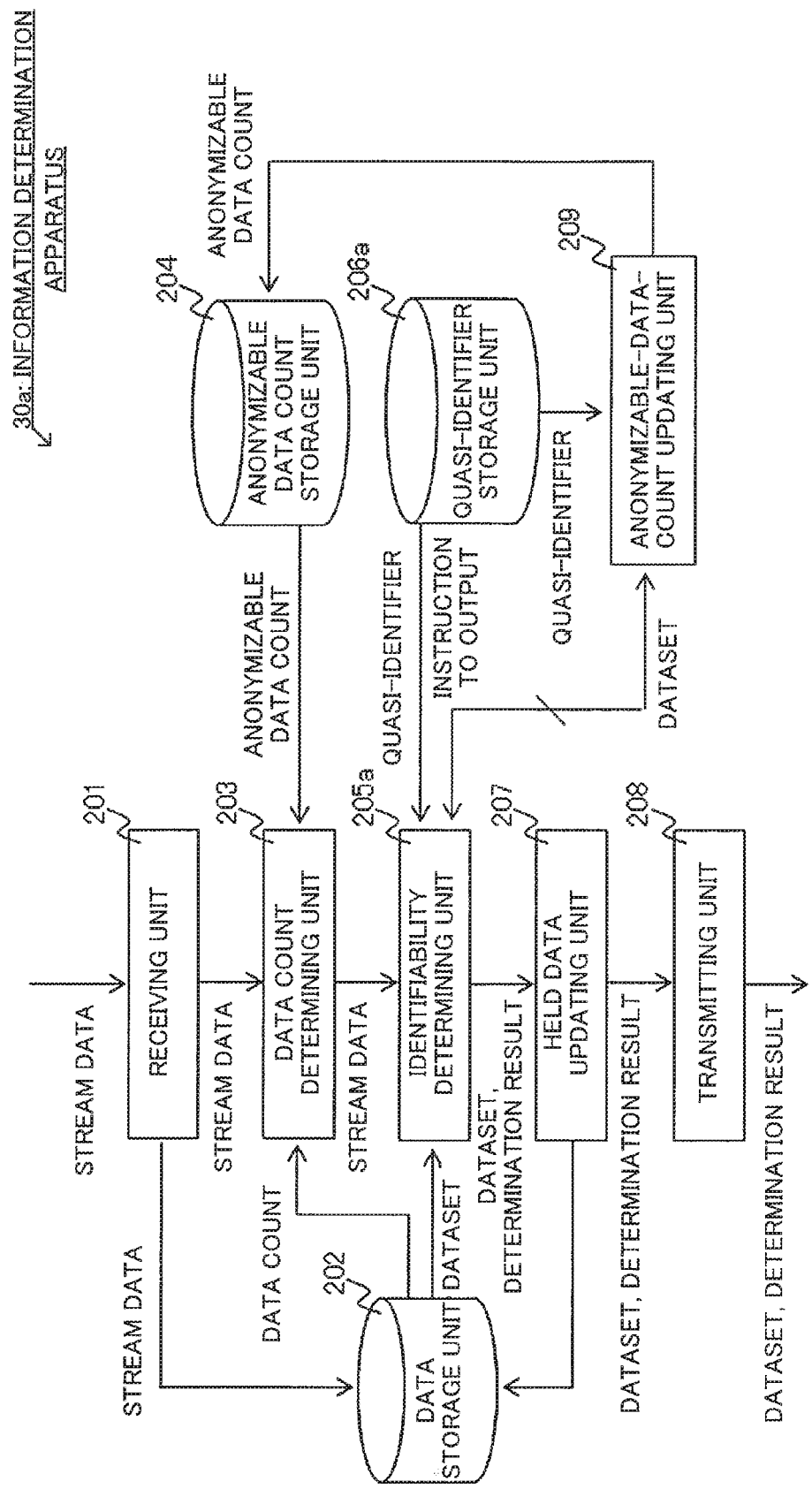
FIG. 9 illustrates an example internal configuration of an information determination apparatus according to a second exemplary embodiment.

FIG. 9 illustrates an example internal configuration of the information determination apparatus 30a according to the second exemplary embodiment.

In FIG. 9, identical reference symbols are used for identical elements as in FIG. 3 and descriptions of these symbols are omitted. Differences between the information determination apparatus 30a and the information determination apparatus 30 lie in operations of the identifiability determining unit 205a, what are held in the quasi-identifier storage unit 206a, and addition of an anonymizable-data-count updating unit (a third determining unit) 209.

The identifiability determining unit 205a is the same as the identifiability determining unit 205 in terms of basic functions and operations. A difference is that the identifiability determining unit 205a delivers to the anonymizable-data-count updating unit 209 the dataset on which a determination has been made as to whether an individual can be identified from the dataset. In addition, after instructed by the anonymizable-data-count updating unit 209 to output a dataset and a determination result, the identifiability determining unit 205a delivers the dataset and determination result to the held data updating unit 207.

The quasi-identifier storage unit 206a stores, by category, quasi-identifiers and possible data values each classified into a subdivision of a quasi-identifier. The system administrator categorizes data pieces each falling under a quasi-identifier into predetermined categories, and registers the categorized data pieces into the quasi-identifier storage unit 206a. More specifically, the system administrator categorizes possible values for the individual quasi-identifiers according to a level of generalization that is meaningful as data to business operators who utilize stream data, and registers the categorized values in a format such as "category name: value 1, value 2, ..., value m" into the quasi-identifier storage unit 206a. Aforementioned "categorize according to a level of generalization that is meaningful as data" means categorizing values belonging to respective quasi-identifiers into units that assure that data is still meaningful as information after the values are generalized to the level of categorization. The quasi-identifier storage unit 206a also stores quasi-identifiers registered by the system administrator, as described in the first exemplary embodiment.

FIG. 10 illustrates an example of quasi-identifiers and their categorizations held in the quasi-identifier storage unit 206a. For example, with reference to FIG. 10, Announcer, Curator, Cram School Teacher, Engineer, Physician, Clerk, Receptionist, etc. are listed as possible values for the quasi-identifier "Occupation". Among these values, Announcer, Curator, and some others are categorized into "Specialist", while Engineer, Physician, and some others are categorized into "Technical". In this way, the quasi-identifier storage unit 206a stores the information that defines relationships between possible values of data (for example, Announcer, Engineer, and the like) classified into a quasi-identifier that is put into a plurality of categories and data pieces (for example, "Specialist", "Technical", and other category names) representing the respective categories.

The anonymizable-data-count updating unit 209 is a means for adjusting the data count of data included in a dataset to be anonymized so that the anonymization apparatus 40 can anonymize a dataset at an appropriate level of generalization. Upon obtaining a dataset from the identifiability determining unit 205a, the anonymizable-data-count updating unit 209 determines whether anonymizing the dataset will result in excessive generalization to create worthless information. More specifically, when the identifiability determining unit 205a determines that an individual can be identified from the dataset, the anonymizable-data-count updating unit 209 carries out conversion of one or more data pieces classified into the same type of quasi-identifier by using the information stored in the quasi-identifier storage unit 206a. The one or more data pieces classified into the same type of quasi-identifier are included in each of a plurality of stream data pieces that constitute the dataset on which the determination has been made.

For example, with reference to FIG. 8, the dataset illustrated therein includes stream data pieces D1 to D3. If the system administrator has registered the quasi-identifier "Age", data pieces that are included in the stream data pieces D1 to D3 and classified into "Age" are different from one another. Thus, the identifiability determining unit 205a determines that an individual can be identified from the dataset. Then, the anonymizable-data-count updating unit 209 carries out conversion of the data pieces that are included in the stream data pieces D1 to D3 and are classified into "Age", based on the information stored in the quasi-identifier storage unit 206a. More specifically, the anonymizable-data-count updating unit 209 converts the ages in the stream data pieces D1 and D3 and the age in the stream data piece D2 into "20s" and "50s", respectively.

Then, the anonymizable-data-count updating unit 209 determines whether an individual can be identified based on the dataset composed of a plurality of stream data pieces where the converted data is included. The specific technique for the determination has been described above in the first exemplary embodiment. In the case of converting data pieces classified into the quasi-identifier in the dataset illustrated in FIG. 8, the ages in the stream data pieces D1 and D3 are both converted into "20s". Accordingly, the anonymizable-data-count updating unit 209 determines that an individual cannot be identified from the two stream data pieces. However, because of the age "50s" included in the stream data piece D2, it is determined that an individual can be identified from the dataset composed of stream data pieces D1 to D3.

Furthermore, when the anonymizable-data-count updating unit 209 determines that the anonymized dataset will be worthless, the anonymizable-data-count updating unit 209 increases the anonymizable data count stored in the anonymizable data count storage unit 204 by a predetermined number. This is because, as the anonymizable data count stored in the anonymizable data count storage unit 204 increases, a dataset is more likely to include stream data pieces that have values falling under the same quasi-identifier. For example, the example described above with reference to FIG. 8 represents that an individual can be identified due to an age of "50s" in the stream data piece D2. Thus, after the three stream data pieces D1 to D3 in FIG. 8 are transmitted to the anonymization apparatus 40, the ages are likely to be excessively generalized. In such cases, the anonymizable-data-count updating unit 209 determines that the anonymized dataset will be worthless. As a result of such determination, the anonymizable-data-count updating unit 209 increases the number of stream data pieces constituting the dataset by increasing the anonymizable data count held in the anonymizable data count storage unit 204. As the number of stream data pieces constituting a dataset increases, the dataset is more likely to have data pieces classified into the same quasi-identifier, making it impossible to identify an individual from the dataset. In the above example, when the stream data pieces D1 to D3 have an additional stream data piece including data that is classified into the quasi-identifier "Age" and is converted to "50s", an individual cannot be identified from the dataset that has such additional stream data including such data.

Figure 11:
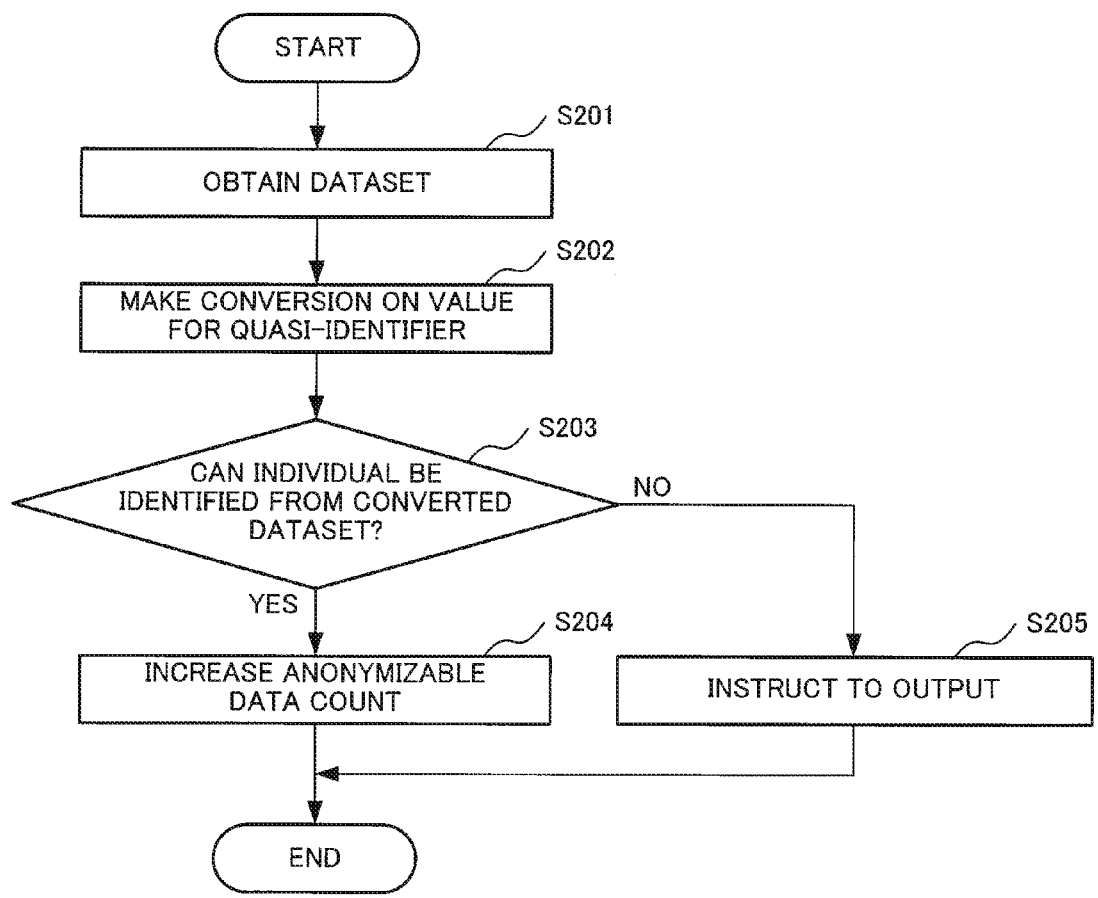
FIG. 11 is a flowchart illustrating example operations of an anonymizable data count updating unit.

FIG. 11 is a flowchart illustrating example operations of the anonymizable-data-count updating unit 209.

In Step S201, the anonymizable-data-count updating unit 209 obtains a dataset from the identifiability determining unit 205a.

In Step S202, the anonymizable-data-count updating unit 209 converts a data piece into a category name that is held in the quasi-identifier storage unit 206a, the data piece being included in the stream data constituting the dataset and being classified into a quasi-identifier. For example, when the quasi-identifier "Occupation" has a data value "Engineer", the anonymizable-data-count updating unit 209 converts "Engineer" into "Technical" to generate a converted dataset.

In Step S203, the anonymizable-data-count updating unit 209 determines whether the converted dataset includes any stream data from which an individual may possibly be identified. A specific method for the determination may be the same as that described above in the first exemplary embodiment, and thus its description is omitted here.

The situation where the converted dataset includes any stream data from which an individual may possibly be identified (Yes branch in Step S203) represents that an individual is highly likely to be identified unless the categories stored in the quasi-identifier storage unit 206a are further generalized. However, the system administrator has determined that further generalization will create worthless information, and thus a step is taken here to increase the probability that there exist stream data pieces having values falling under the same quasi-identifier by increasing the number of data pieces constituting the dataset. Accordingly, the anonymizable-data-count updating unit 209 increases the value of the anonymizable data count stored in the anonymizable data count storage unit 204 (Step S204).

Upon completion of the process in Step S204, the anonymizable-data-count updating unit 209 ends its processing. Then, the identifiability determining unit 205a re-determines whether an individual can be identified from the dataset, using the updated anonymizable data count. In this case, the anonymizable-data-count updating unit 209 repeats the processes from Step S201 to Step S203 with respect to the dataset on which determination has been made, using the updated anonymizable data count.

When the processes of increasing the anonymizable data count and making determination on a converted dataset are repeated and it is determined that the resulting converted dataset does not include any stream data from which an individual can be identified (No branch in Step S203), the processing proceeds to Step S205. At this point, identification of an individual can be avoided by the maximum generalization conceived by the system administrator. Accordingly, the anonymizable-data-count updating unit 209 instructs the identifiability determining unit 205a to output the dataset and determination result (Step S205).

Alternatively, after determining that an individual cannot be identified from the converted dataset (No branch in Step S203), the anonymizable-data-count updating unit 209 may decrease the anonymizable data count stored in the anonymizable data count storage unit 204 by a predetermined number. In this case, the anonymizable-data-count updating unit 209 sequentially decreases the anonymizable data count. Meanwhile, the information determination apparatus 30a alternately repeats the processes illustrated in FIG. 11 performed by the anonymizable-data-count updating unit 209 and re-determination made by the identifiability determining unit 205a. Then, the anonymizable-data-count updating unit 209 gives an instruction to output the dataset with the anonymizable data count in one cycle immediately before the anonymizable data count indicates its lowest limit (Yes branch in Step S203).

In the second exemplary embodiment, in order to prevent excessive generalization causing a dataset to be worthless, the system administrator categorizes possible data values classified into a quasi-identifier and stores such data values into the quasi-identifier storage unit 206a. In other words, the system administrator defines what are stored in the quasi-identifier storage unit 206a, taking into consideration characteristics of services provided by the server 50 and specific anonymization processes performed by the anonymization apparatus 40. Hence, the information determination apparatus 30a transmits the dataset held in the data storage unit 202, not the dataset that has undergone quasi-identifier conversion, to the anonymization apparatus 40.

Alternatively, the information determination apparatus 30a may transmit to the anonymization apparatus 40 the dataset composed of a plurality of stream data pieces that have undergone quasi-identifier conversion. This can reduce a burden on the anonymization apparatus 40 because part of processes to be handled in the anonymization apparatus 40 is incorporated in the information determination apparatus 30a.

As seen above, the anonymizable-data-count updating unit 209 according to the second exemplary embodiment includes a function to carry out a conversion of a data piece that is classified into a quasi-identifier for stream data constituting the dataset on which a determination has been made by the identifiability determining unit 205a, by using the information stored in the quasi-identifier storage unit 206a. In addition, the anonymizable-data-count updating unit 209 includes a function to determine whether an individual can be identified from the dataset that has undergone quasi-identifier conversion. The anonymizable-data-count updating unit 209 further includes a function to update the anonymizable data count if necessary.

The information determination apparatus 30a according to the second exemplary embodiment adjusts a value of the anonymizable data count when it is determined that anonymizing a dataset will result in excessively high generalization. As a result, an anonymizing process carried out by the anonymization apparatus 40 is less likely to produce a dataset that includes excessively generalized data.

Third Exemplary Embodiment

A third exemplary embodiment will now be described in detail with reference to the drawings.

The information determination apparatus 30 according to the first exemplary embodiment determines whether an individual can be identified from stream data. It should be noted that stream data is momently added at all times. Therefore, while an individual cannot be identified only from a dataset transmitted from the information determination apparatus 30 to the anonymization apparatus 40 at a time, an individual may still be identified in combination with a plurality of datasets that are transmitted at other times.

As an example, it is assumed here that a dataset as of a time T0, a dataset as of a time T1, and a dataset as of a time T2 are represented by (a) of FIG. 12, (b) of FIG. 12, and (c) of FIG. 12, respectively. In FIG. 12, it is also assumed that IDs (identifiers) for identifying mobile terminals 20, which are sources of stream data, are additionally transmitted by mobile terminals 20 to the information determination apparatus 30.

With reference to FIG. 12, supposing that the quasi-identifiers are defined to be "Gender" and "Age", then the information determination apparatus 30 according to the first exemplary embodiment determines that an individual cannot be identified from any of the datasets. As a result, the anonymization apparatus 40 replaces the IDs with anonymous IDs and transmits the datasets to the server 50 without anonymizing any of the datasets. Specifically, the anonymization apparatus 40 converts the dataset in (a) of FIG. 12, the dataset in (b) of FIG. 12, and the dataset in (c) of FIG. 12 into the datasets shown in (a) of FIG. 13, (b) of FIG. 13, and (c) of FIG. 13, respectively. The anonymization apparatus 40 then transmits the converted datasets to the server 50. Each of the resultant three datasets now includes an anonymous ID of "00A". Consequently, the server 50 (the application developer) receiving these three datasets may possibly identify an individual, finding out that a person with "Anonymous ID=00A" is a man, 22 years old, and working for a company located at (X1, Y1).

The information determination apparatus 30b according to the third exemplary embodiment combines a plurality of datasets to determine whether an individual can be identified and to decrease the likelihood of such identification.

Figure 14:
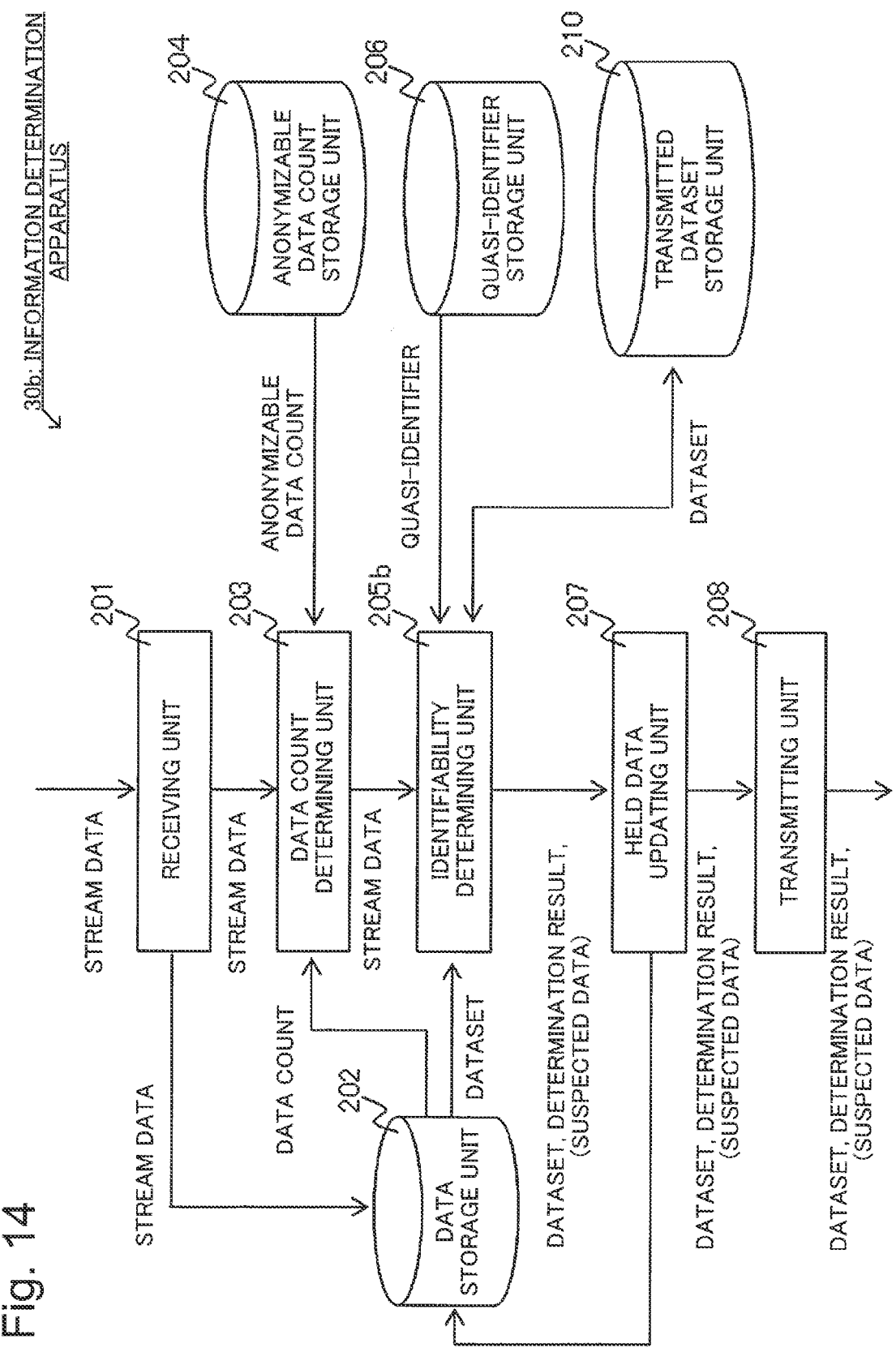
FIG. 14 illustrates an example internal configuration of an information determination apparatus according to a third exemplary embodiment.

FIG. 14 illustrates an example internal configuration of the information determination apparatus 30b according to the third exemplary embodiment. In FIG. 14, identical reference symbols are used for identical elements as in FIG. 3 and descriptions of these symbols are omitted. Differences between the information determination apparatus 30 and the information determination apparatus 30b lie in operations of the identifiability determining unit 205b and addition of a transmitted dataset storage unit (a second storage unit) 210.

The identifiability determining unit 205b is a means for re-determining whether an individual can be identified based on datasets stored in the data storage unit 202 and in the transmitted dataset storage unit 210, when the identifiability determining unit 205b has determined that an individual can be identified based on the dataset stored in the storage unit 202. In this way, the identifiability determining unit 205b combines a plurality of datasets to determine whether an individual can be identified.

More specifically, among a plurality of stream data pieces included in a dataset on which the identifiability determining unit 205b has determined that an individual is identified, the identifiability determining unit 205b counts how many times the stream data that does not include one or more data pieces classified into the same type of quasi-identifier exists in datasets stored in the transmitted dataset storage unit 210. The stream data that does not include one or more data pieces classified into the same type of quasi-identifier herein refers to the stream data from which an individual may possibly be identified. When the counted number of times is equal to or greater than a predetermined value, the identifiability determining unit 205b determines whether an individual can be identified based on the dataset on which the identifiability determining unit 205b has made a determination. That is, with respect to the individual stream data pieces stored in the data storage unit 202, the identifiability determining unit 205b determines that an individual can be identified when any stream data having a data piece classified into the same type of quasi-identifier exists at least a predetermined number of times in the datasets that were transmitted during a predetermined period. The above-mentioned "a predetermined period" and "a predetermined number of times" are values that the system administrator sets into the information determination apparatus 30b in advance. In addition, the identifiability determining unit 205b stores into the transmitted dataset storage unit 210 a dataset to be transmitted to the anonymization apparatus 40 through the transmitting unit 208.

The transmitted dataset storage unit 210 is a means for storing datasets that were transmitted from the information determination apparatus 30b to the anonymization apparatus 40.

Figure 15:
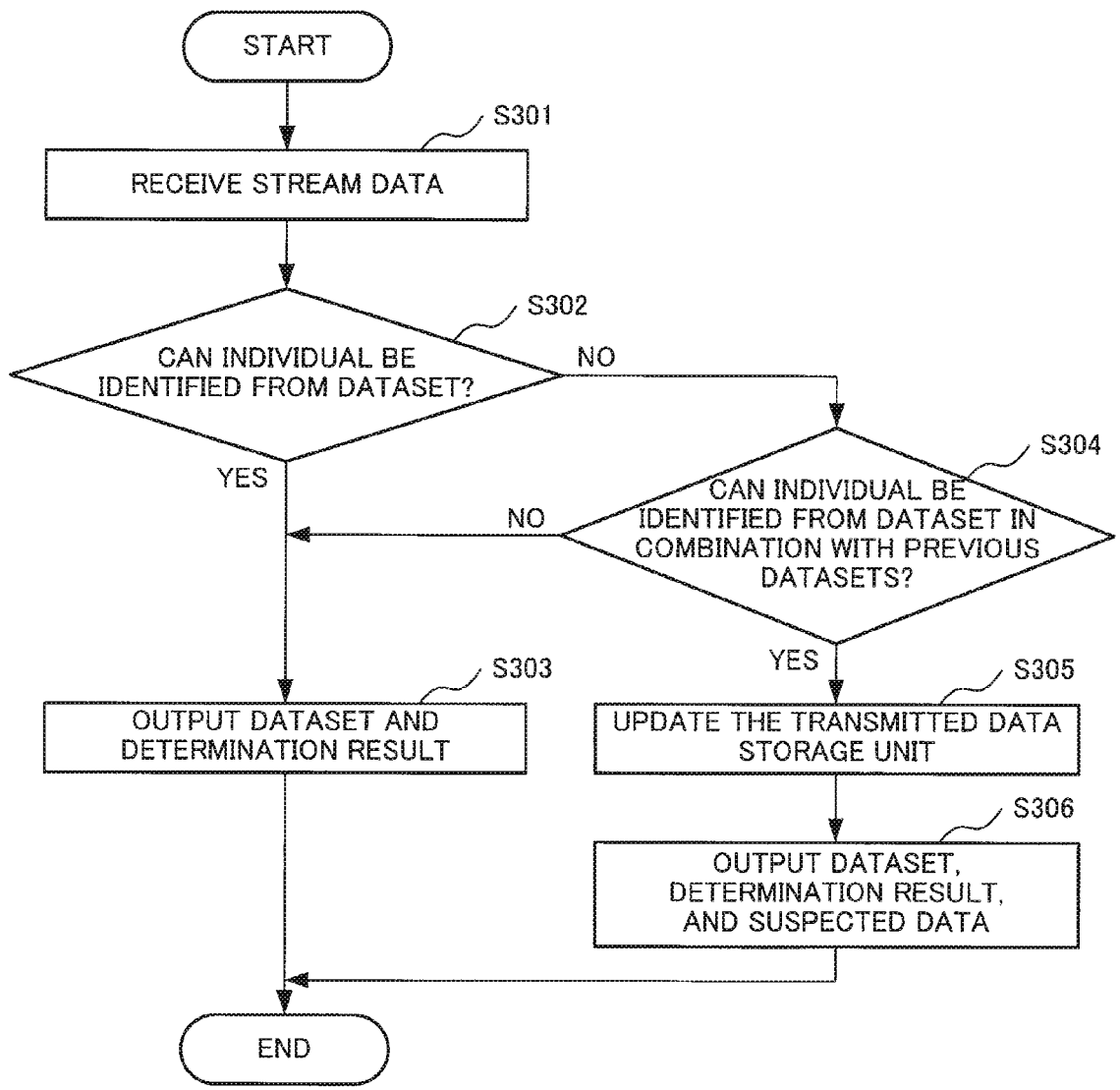
FIG. 15 is a flowchart illustrating example operations of an identifiability determining unit.

FIG. 15 is a flowchart illustrating example operations of the identifiability determining unit 205b.

Upon receipt of stream data from the data count determining unit 203 (Step S301), the identifiability determining unit 205b determines whether an individual can be identified from the dataset held in the data storage unit 202 (Step S302). A specific method for the determination may be the same as that described above in the first exemplary embodiment, and thus its description is omitted here.

When an individual may possibly be identified from the dataset (Yes branch in Step S302), the identifiability determining unit 205b delivers the dataset and determination result to the held data updating unit 207 (Step S303). The determination result in this case is "identifiable", and thus the anonymization apparatus 40 will anonymize the dataset after receipt of such dataset.

On the other hand, when an individual cannot be identified from the dataset (No branch in Step S302), the identifiability determining unit 205b determines whether an individual can be identified from a previous dataset (Step S304). Specifically, with respect to the individual stream data pieces constituting the dataset stored in the data storage unit 202, the identifiability determining unit 205b verifies whether any stream data having a data piece classified into the same quasi-identifier exists at least a predetermined number of times in the datasets that were transmitted during a predetermined period. In this way, the identifiability determining unit 205b combines the current dataset with a previous dataset to determine whether an individual can be identified. The aforementioned "a predetermined period" may be replaced with a predetermined number of datasets. A specific method for the determination will be described later.

When the identifiability determining unit 205b determines that an individual cannot be identified from the dataset in combination with a previous dataset (No branch in Step S304), the identifiability determining unit 205b performs the process in Step S303. In this case, it is already determined in Step S302 that an individual cannot be identified from the current dataset. It is also determined in Step S304 that an individual cannot be identified from a previous dataset. Hence, an individual is unlikely to be identified regardless of whether the anonymization apparatus 40 anonymizes the current dataset. Accordingly, when performing the process in Step S303 after going through Step S304, the identifiability determining unit 205b assigns "non-identifiable" to the determination result and delivers the result along with the dataset to the held data updating unit 207.

When the identifiability determining unit 205b determines that an individual can be identified from the dataset in combination with a previous dataset (Yes branch in Step S304), the identifiability determining unit 205b deletes any dataset representing that a predetermined period has passed from datasets stored in the transmitted dataset storage unit 210 (Step S305). In addition, the identifiability determining unit 205b updates the transmitted dataset storage unit 210 by adding thereto a pair of data pieces composed of the dataset currently held in the data storage unit 202 and the current time.

In Step S306, the identifiability determining unit 205b delivers to the held data updating unit 207 the dataset, the determination result, and the stream data (hereinafter denoted as suspected data) from which an individual may possibly be identified in combination with a previous dataset. In this case, although an individual cannot be identified from the dataset to be transmitted, an individual is highly likely to be identified when a previous dataset is taken into consideration. For this reason, the identifiability determining unit 205b preferably presents a determination result different from "identifiable" or "non-identifiable" with, for example, "identifiability unknown" as the result. After receiving a determination result representing "identifiability unknown", the anonymization apparatus 40 can reduce the probability of identification of an individual by anonymizing the received dataset.

Alternatively, the identifiability determining unit 205b may make it difficult to combine with a previous dataset by, for example, manipulating a suspected data value for a quasi-identifier (for example, adding 1 to a data value for the quasi-identifier "Age").

Details of Step S304 in FIG. 15 will now be described.

Figure 16:
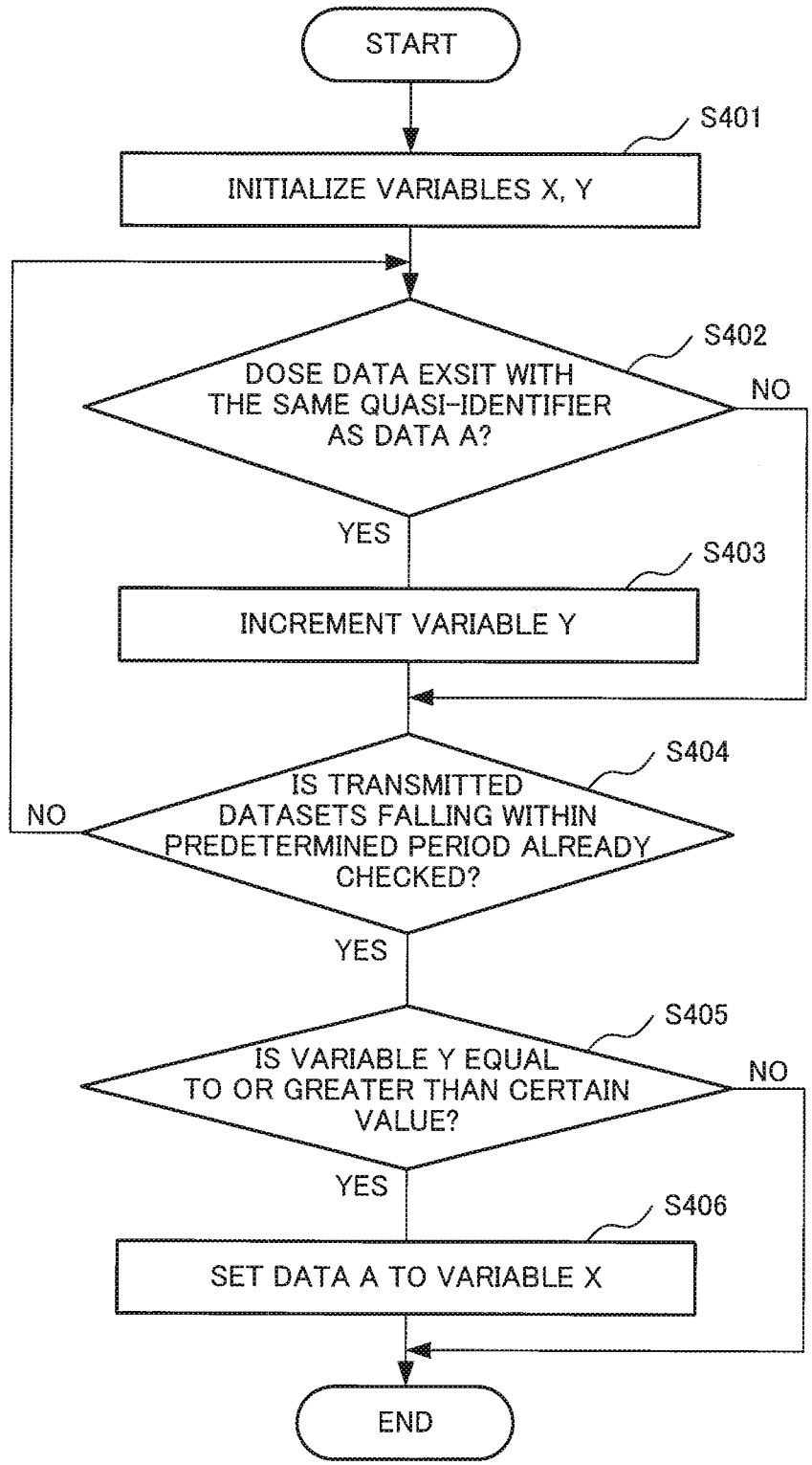
FIG. 16 is a flowchart illustrating an example process of determining whether an individual can be identified from a previous dataset.

FIG. 16 is a flowchart for an example process of determining whether an individual can be identified by combining with a previous dataset. In FIG. 16, a stream data piece which is part of a dataset and from which it is determined in Step S302 that an individual may possibly be identified is denoted as data A. A variable that stores data A is denoted as x, while a variable for counting the number of times data A appears in datasets that were transmitted during a predetermined period is denoted as y.

In Step S401, the identifiability determining unit 205b initializes the variables x and y.

In Step S402, the identifiability determining unit 205*b* determines whether any data piece being part of the dataset held in the transmitted dataset storage unit 210 exists that is the same as the data piece classified into the quasi-identifier for data A. When such data piece exists (Yes branch in Step S402), the identifiability determining unit 205*b* increments the variable y (y=y+1) (Step S403). When no such data appears (No branch in Step S402), the identifiability determining unit 205*b* does not perform any specific process.

In Step S404, the identifiability determining unit 205*b* determines whether the process in Step S402 has been finished on each of the datasets which are held in the transmitted dataset storage unit 210, and which have already been transmitted and fall within a predetermined period of time. In other words, the identifiability determining unit 205*b* makes a determination on these datasets as to whether the process of checking when there is any data identical to the data piece classified into the quasi-identifier is finished. When any necessary dataset check is not finished (No branch in Step S404), the identifiability determining unit 205*b* repeats Step S402 and subsequent processes.

If necessary dataset checks are finished (Yes branch in Step S404), the identifiability determining unit 205*b* compares the variable y with a predetermined value (a certain value) (Step S405).

When the comparison finds that the variable y is equal to or greater than the certain value (Yes branch in Step S405), the identifiability determining unit 205*b* assigns data A to the variable x (Step S406). The variable x to which data A is assigned is handled as suspected data. When the comparison finds that the variable y is less than the certain value (No branch in Step S405), the identifiability determining unit 205*b* does not perform any specific process.

As seen above, the information determination apparatus 30*b* according to the third exemplary embodiment determines whether an individual can be identified by combining a plurality of datasets. In addition, the information determination apparatus 30*b* decreases the likelihood that an individual is identified by transmitting to the anonymization apparatus 40 the stream data, as suspected data, from which an individual may possibly be identified in combination with a previous dataset.

Fourth Exemplary Embodiment

A fourth exemplary embodiment will now be described in detail with reference to the drawings.

Both of the information determination apparatus 30 and the anonymization apparatus 40 according to the first exemplary embodiment transfer data received from a mobile terminal 20 to the server 50. In another possible system, however, either the information determination apparatus 30 or the anonymization apparatus 40 may narrow down the datasets to be transmitted to the server 50.

In one conceivable system, for example, certain conditions (rules) are set into the information determination apparatus 30 in advance, and the received data for the datasets satisfying the conditions are only allowed to be transmitted to the server 50.

In this case, when a plurality of conditions are set into the information determination apparatus 30 and datasets satisfying these conditions are transmitted to the server 50, an individual may possibly be identified when these datasets are combined.

By way of example, it is assumed here that an application, which is coupon delivery services, is implemented in the server 50 to deliver coupons to the sources (mobile terminals 20) supplying stream data pieces that satisfy certain conditions. It is further assumed that Coupon 1 offering discount for Restaurant A is delivered to users with information relating to a position within a 500 m radius from Station A, while Coupon 2 offering discount for Restaurant B is delivered to users with information relating to a position within a 300 m radius from Station A.

The server 50 is assumed to have received the dataset illustrated in (a) of FIG. 17 from the information determination apparatus 30, where the dataset includes information representing positions within a 500 m radius from Station A and is used for delivering Coupon 1. The server 50 is assumed to have additionally received the dataset illustrated in (b) of FIG. 17 from the information determination apparatus 30, where the dataset includes information representing positions within a 300 m radius from Station A and is used for delivering Coupon 2.

Then, performing k-anonymization (k=2, quasi-identifiers are Age and Occupation) assures that an individual cannot be identified as long as only the two datasets are utilized. However, combining the two datasets (the datasets in (a) of FIG. 17 and (b) of FIG. 17) reveals that a source (a mobile terminal 20) located between a 300 m to 500 m radius from Station A corresponds to the stream data D3 in (a) of FIG. 17, with the result that an individual may possibly be identified.

Figure 18:
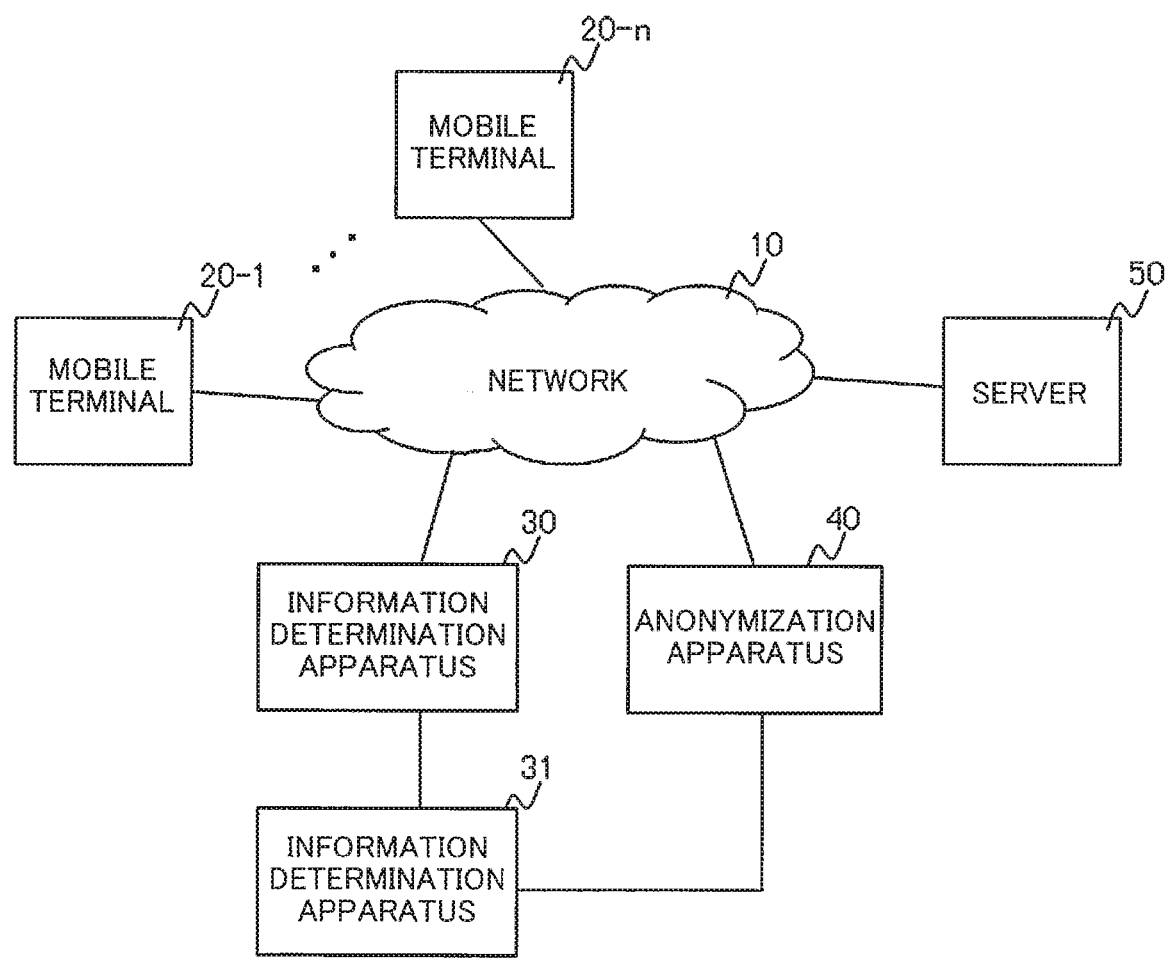
FIG. 18 illustrates an example configuration of a data processing system according to a fourth exemplary embodiment.

The information determination apparatus 31 according to the fourth exemplary embodiment determines whether an individual can be identified by combining datasets obtained through narrowing down based on a plurality of conditions. The information determination apparatus 31 according to the fourth exemplary embodiment operates being disposed between the information determination apparatus 30 and the anonymization apparatus 40 of the first exemplary embodiment (see FIG. 18).

In the information determination apparatus 30, a plurality of conditions are set thereto for determinations to be made when datasets are transmitted, and the conditions are managed so that each condition is associated with a service. Thus, it is assumed that the information determination apparatus 30 transmits a dataset along with an ID for identifying a service (service ID) that is associated with a specific condition.

Figure 19:
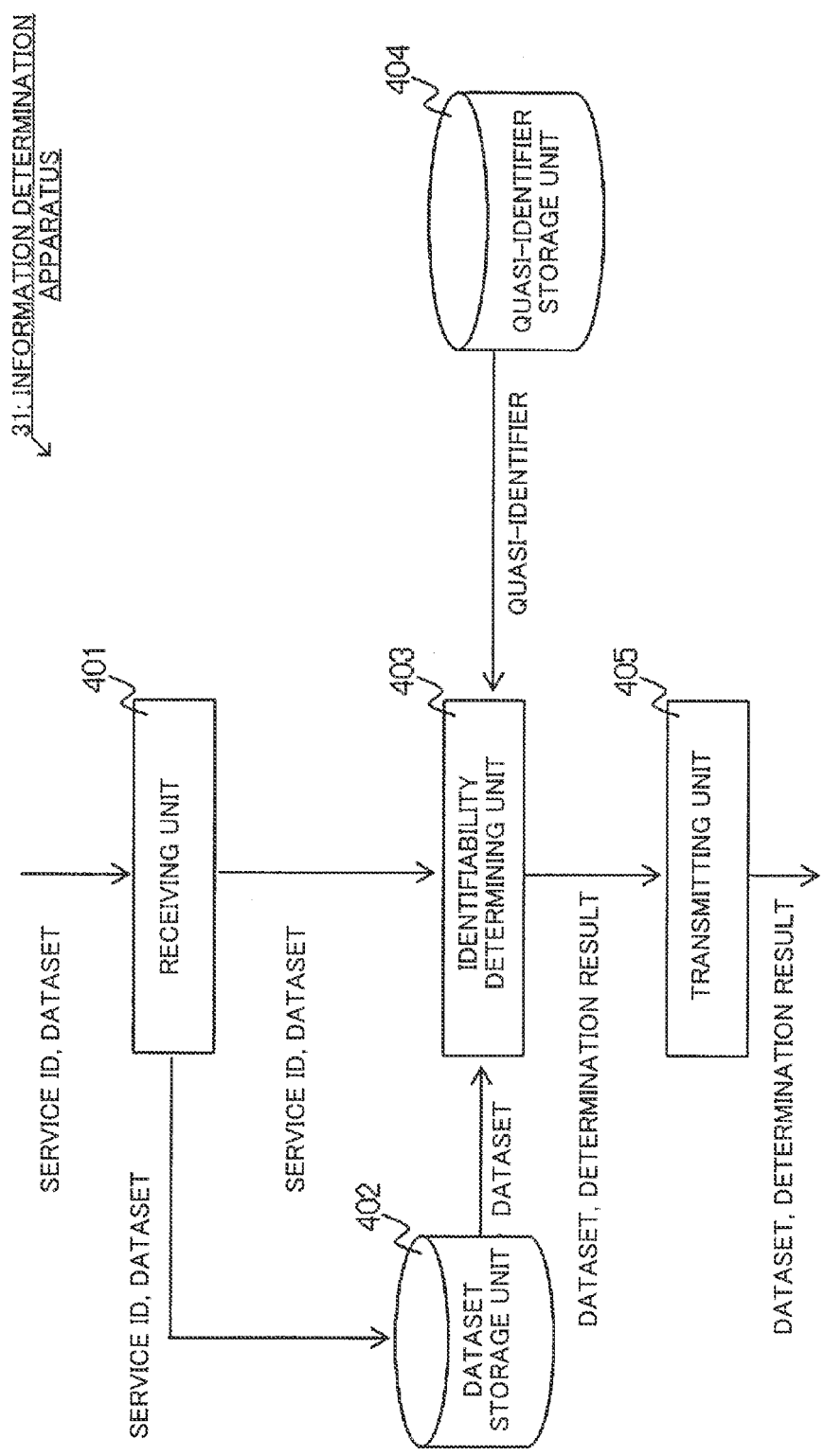
FIG. 19 illustrates an example internal configuration of an information determination apparatus according to the fourth exemplary embodiment.

FIG. 19 illustrates an example internal configuration of the information determination apparatus 31 according to the fourth exemplary embodiment.

With reference to FIG. 19, the information determination apparatus 31 is configured to include a receiving unit 401, a dataset storage unit 402, an identifiability determining unit 403, a quasi-identifier storage unit 404, and a transmitting unit 405.

The receiving unit 401 stores the service ID and dataset received from the information determination apparatus 30 into the dataset storage unit 402. The dataset storage unit 402 holds zero or more pairs each composed of a service ID and a dataset (see FIG. 20). The receiving unit 401 updates the dataset that is stored in the dataset storage unit 402 in a column corresponding to the received service ID to the received dataset. Then, the receiving unit 401 delivers the received service ID and dataset to the identifiability determining unit 403.

The identifiability determining unit 403 determines whether an individual can be identified when datasets obtained based on a plurality of conditions are combined. Supposing that z conditions are set into the information determination apparatus 30, then a dataset can be classified into a maximum of $2^z$ groups. For example, suppose that two conditions (Condition 1, Condition 2) are set into the information determination apparatus 30. Then, a dataset can be classified into four groups: neither Condition 1 nor Condition 2 is applicable, Condition 1 is applicable, Condition 2 is applicable, and both Condition 1 and Condition 2 are applicable.

Then, the identifiability determining unit 403 determines whether an individual can be identified from a dataset constituting each of the classified groups by using a quasi-identifier as described in the first exemplary embodiment.

The transmitting unit 405 transmits the obtained dataset and determination result to the anonymization apparatus 40. The quasi-identifier storage unit 404 stores quasi-identifiers as in the quasi-identifier storage unit 206 described in the first exemplary embodiment.

Figures 20, 21:
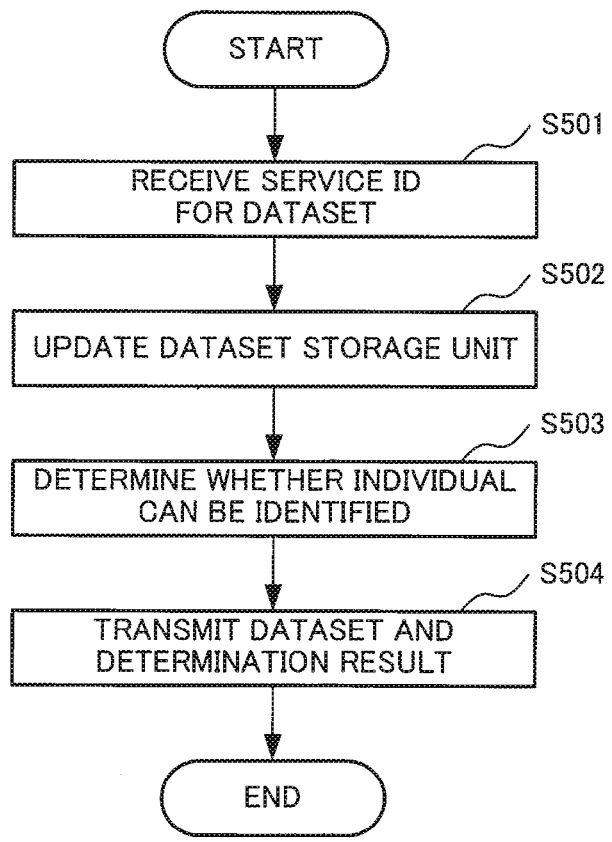
FIG. 20 illustrates an example of data stored in a dataset storage unit.
FIG. 21 is a flowchart illustrating example operations of the information determination apparatus according to the fourth exemplary embodiment.

Operations of the information determination apparatus 31 are outlined in the flowchart illustrated in FIG. 21.

In Step S501, the receiving unit 401 receives a dataset and a service ID from the information determination apparatus 30. Next, the receiving unit 401 updates the dataset that is stored in the dataset storage unit 402 to the received dataset (Step S502). At the same time, the receiving unit 401 delivers the received dataset and service ID to the identifiability determining unit 403.

In Step S503, upon obtaining the service ID, the identifiability determining unit 403 determines whether an individual can be identified from the dataset held in the dataset storage unit 402. Then, the identifiability determining unit 403 delivers the dataset and the determination result to the transmitting unit 405.

In Step S504, the transmitting unit 405 transmits the dataset and the determination result to the anonymization apparatus 40. When it is determined in Step S503 that an individual can be identified, the transmitting unit 405 transmits the determination result "identifiable" to the anonymization apparatus 40 irrespective of whether an individual cannot be identified from the dataset alone. As a result, the anonymization apparatus 40 anonymizes the dataset to decrease the likelihood that an individual is identified from the dataset.

As seen above, the information determination apparatus 31 according to the fourth exemplary embodiment determines whether an individual can be identified by combining datasets obtained through narrowing down based on a plurality of conditions, so as to decrease the likelihood that an individual can be identified.

The configurations of the data processing systems illustrated in the first to fourth exemplary embodiments (FIGS. 2 and 18) are examples only and are not intended to limit system configurations. For example, functions of the information determination apparatus 30 may be incorporated in the anonymization apparatus 40. Alternatively, the information determination apparatus 31 illustrated in the fourth exemplary embodiment may be implemented as part of functions of the information determination apparatus 30, 30a, or 30b.

Processes handled by units such as the data count determining unit 203, the identifiability determining unit 205, and the held data updating unit 207 in, for example, the information determination apparatus 30 can be implemented by computer programs that cause a computer installed in the information determination apparatus 30 to perform the above-described processes using hardware for the computer. That is, means for executing functions with some hardware and/or software to be performed by the data count determining unit 203 and other units are only needed.

In addition, a computer can act as the information determination apparatus when the above-described computer programs are installed in a storage unit for the computer. Furthermore, by causing the computer to execute the above-described computer programs, the method for determining whether an individual can be identified from a dataset can be executed by the computer.

The whole or part of the above exemplary embodiments can be described as, but is not limited to, the following supplementary notes.

[Supplementary Note 1]

An information determination apparatus including:

a first storage unit that stores stream data pieces obtained in time sequence;

a first determining unit that determines whether the number of stream data pieces stored in the first storage unit is at least equal to a predetermined value; and a second determining unit that determines, when the number of the stream data pieces stored in the first storage unit is equal to or greater than the predetermined value, whether an individual can be identified based on a dataset composed of a plurality of the stream data pieces stored in the first storage unit, and outputs the dataset used for the determination and the determination result.

[Supplementary Note 2]

The information determination apparatus according to Supplementary Note 1, wherein the stream data piece stored in the first storage unit includes a data piece classified into a quasi-identifier which in combination with another value allows for identification of an individual, and wherein the second determining unit determines that an individual is identified when one or more data pieces are unmatched, the one or more data pieces being included in each of a plurality of stream data pieces stored in the first storage unit and being classified into the same type of quasi-identifier.

[Supplementary Note 3]

The information determination apparatus according to Supplementary Note 1 or 2, further including:

a data updating unit that instructs, when a dataset used for the determination by the second determining unit and the determination result are obtained from the second determining unit, the first storage unit to delete a dataset corresponding to the dataset used for the determination.

[Supplementary Note 4]

The information determination apparatus according to any one of Supplementary Notes 1 to 3, wherein possible values of data classified into a quasi-identifier are divided into a plurality of categories, and wherein the information determination apparatus further includes a third determining unit configured to converts, based on information that defines relationships between data pieces representing the plurality of categories and data pieces included in the respective categories, the data pieces included in the respective categories into the data pieces representing the categories, and determines whether an individual is identified based on a dataset composed of a plurality of stream data pieces included the converted data pieces.

[Supplementary Note 5]

The information determination apparatus according to Supplementary Note 4, wherein the third determining unit increases, when determining that an individual can be identified, the predetermined value used for the first determining unit by a predetermined number, and decreases, when determining that an individual cannot be identified, the predetermined value used for the first determining unit by a predetermined number.

[Supplementary Note 6]

The information determination apparatus according to any one of Supplementary Notes 1 to 5, further including:

a second storage unit that stores a dataset which was used by the second determining unit for the determination and was output by the second determining unit in the past, wherein the second determining unit determines, by re-determining whether an individual is identified based on datasets stored in the first and second storage units when determining that an individual is identified based on a dataset stored in the first storage unit, whether an individual is identified based on the dataset used for the determination.

[Supplementary Note 7]

The information determination apparatus according to Supplementary Note 6, wherein the second determining unit counts, among a plurality of stream data pieces included in a dataset on which the second determining unit has determined that an individual is identified, how many times the stream data that does not include one or more data pieces classified into the same type of quasi-identifier exists in datasets stored in the second storage unit, and, when the counted number of times is equal to or greater than a predetermined value, re-determines whether an individual is identified based on the dataset used for the determination.

[Supplementary Note 8]

The information determination apparatus according to any one of Supplementary Notes 1 to 7, further including:

a receiving unit that receives stream data supplied from outside and stores the stream data into the first storage unit; and a transmitting unit that externally outputs the dataset that is determined by the second determination unit and the determination result.

[Supplementary Note 9]

The information determination apparatus according to any one of Supplementary Notes 1 to 8, wherein the stream data piece stored in the first storage unit includes: a data piece relating to a generation apparatus generating the stream data piece; a data piece relating to a holder of the generation apparatus; and a data piece generated based on measurement information taken by the generation apparatus.

[Supplementary Note 10]

An information determination apparatus including:

a storage unit that stores a plurality of datasets each of which is composed of a plurality of stream data pieces obtained in time sequence, the datasets being obtained through narrowing down based on a predetermined rule; and a determining unit that determines whether an individual related to the obtained stream data pieces is identified by combining the plurality of datasets obtained through narrowing down.

[Supplementary Note 11]

An information determination method including:

storing stream data pieces obtained in time sequence;

making a first determination as to whether the number of the stored stream data pieces is at least equal to a predetermined value;

when the number of the stored stream data pieces is equal to or greater than a predetermined value, making a second determination as to whether an individual is identified based on a dataset composed of a plurality of the stored stream data pieces; and outputting the dataset used for the second determination and a determination result.

[Supplementary Note 12]

A computer-readable recording medium recording a program that causes a computer disposed in an information determination apparatus to execute the processes of:

storing stream data pieces obtained in time sequence;

making a first determination as to whether the number of the stored stream data pieces is at least equal to a predetermined value;

when the number of the stored stream data pieces is equal to or greater than a predetermined value, making a second determination as to whether an individual is identified based on a dataset composed of a plurality of the stored stream data pieces; and outputting the dataset used for the second determination and a determination result.

[Supplementary Note 13]

A data processing system including:

the information determination apparatus according to any one of Supplementary Notes 1 to 10; and an anonymization apparatus that determines execution of an anonymization process on a dataset transmitted by the information determination apparatus based on the determination result.

Each of the embodiments according to Supplementary Notes 11 to 13 can be turned into the embodiments according to Supplementary Notes 2 to 9 as with Supplementary Note 1.

The disclosure of the non-patent literature cited above is incorporated by reference herein.

Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and samples, respective elements of the respective drawings, and the like) are possible within the scope of the claims of the present invention. That is, the present invention clearly includes every type of transformation and modification that a person skilled in the art can achieve according to the entire disclosure of the present invention including the claims and to technological concepts thereof. In particular, it should be understood that a range of values appearing herein includes any value and sub-range falling in the range as if they are specifically set forth herein unless otherwise stated.

The present application claims priority based on Japanese Patent Application No. 2014-019439 filed on Feb. 4, 2014, the entire disclosure of which is incorporated herein.

REFERENCE SIGNS LIST

10 Network
20, 20-1 to 20-$n$ Mobile terminal
30, 30$a$, 30$b$, 31, 100 Information determination apparatus
40 Anonymization apparatus
50 Server
101 First storage unit
102 First determining unit
103 Second determining unit
201, 301, 401 Receiving unit
202 Data storage unit
203 Data count determining unit
204 Anonymizable data count storage unit 205, 205a, 205b, 403 Identifiability determining unit
206, 206a, 404 Quasi-identifier storage unit
207 Held data updating unit
208, 303, 405 Transmitting unit
209 Anonymizable-data-count updating unit
210 Transmitted dataset storage unit
302 Anonymizing unit
402 Dataset storage unit

What is claimed is:

1. An information determination apparatus comprising:
a first storage unit configured to store stream data pieces obtained in time sequence;
a first determining unit configured to determine whether the number of stream data pieces stored in the first storage unit is at least equal to a predetermined value; and
a second determining unit configured to determine, when the number of the stream data pieces stored in the first storage unit is equal to or greater than the predetermined value, whether an individual can be identified based on a dataset composed of a plurality of the stream data pieces stored in the first storage unit, and outputting the dataset used for the determination and the determination result;
wherein possible values of data classified into a quasi-identifier are divided into a plurality of categories, and
wherein the information determination apparatus further comprises a third determining unit configured to convert, based on information that defines relationships between data pieces representing the plurality of categories and data pieces included in the respective categories, the data pieces included in the respective categories into the data pieces representing the categories, and determine whether an individual is identified based on a dataset composed of a plurality of stream data pieces included in the converted data pieces.

2. The information determination apparatus according to claim 1,
wherein the stream data piece stored in the first storage unit includes a data piece classified into a quasi-identifier which in combination with another value allows for identification of an individual,
and wherein the second determining unit determines that an individual is identified when one or more data pieces are unmatched, the one or more data pieces being included in each of a plurality of stream data pieces stored in the first storage unit and being classified into the same type of quasi-identifier.

3. The information determination apparatus according to claim 1, further comprising:
a data updating unit configured to instruct, when a dataset used for the determination by the second determining unit and the determination result are obtained from the second determining unit, the first storage unit to delete a dataset corresponding to the dataset used for the determination.

4. The information determination apparatus according to claim 1,
wherein the third determining unit increases, when determining that an individual can be identified, the predetermined value used for the first determining unit by a predetermined number,
and decreases, when determining that an individual cannot be identified, the predetermined value used for the first determining unit by a predetermined number.

5. The information determination apparatus according to claim 1, further comprising:

a second storage unit configured to store a dataset which was used by the second determining unit for the determination and was output by the second determining unit in the past,
wherein the second determining unit determines, by re-determining whether an individual is identified based on datasets stored in the first and second storage units when determining that an individual is identified based on a dataset stored in the first storage unit, whether an individual is identified based on the dataset used for the determination.

6. The information determination apparatus according to claim 5,
wherein the second determining unit counts, among a plurality of stream data pieces included in a dataset on which the second determining unit has determined that an individual is identified, how many times the stream data that does not include one or more data pieces classified into the same type of quasi-identifier exists in datasets stored in the second storage unit, and, when the counted number of times is equal to or greater than a predetermined value, re-determines whether an individual is identified based on the dataset used for the determination.

7. The information determination apparatus according to claim 1, further comprising:
a receiving unit configured to receive stream data supplied from outside and store the stream data into the first storage unit; and
a transmitting unit configured to externally output the dataset that is determined by the second determination unit, and the determination result.

8. An information determination method comprising:
storing stream data pieces obtained in time sequence;
making a first determination as to whether the number of the stored stream data pieces is at least equal to a predetermined value;
when the number of the stored stream data pieces is equal to or greater than a predetermined value, making a second determination as to whether an individual is identified based on a dataset composed of a plurality of the stored stream data pieces; and
outputting the dataset used for the second determination and a determination result;
wherein possible values of data classified into a quasi-identifier are divided into a plurality of categories; and
wherein the method further comprises:
converting, based on information that defines relationships between data pieces representing the plurality of categories and data pieces included in the respective categories, the data pieces included in the respective categories into the data pieces representing the categories, and
determining whether an individual is identified based on a dataset composed of a plurality of stream data pieces included in the converted data pieces.

9. A non-transitory computer-readable recording medium recording a program that causes a computer disposed in an information determination apparatus to execute a method comprising:
storing stream data pieces obtained in time sequence;
making a first determination as to whether the number of the stored stream data pieces is at least equal to a predetermined value;
when the number of the stored stream data pieces is equal to or greater than a predetermined value, making a second determination as to whether an individual is identified based on a dataset composed of a plurality of the stored stream data pieces; and outputting the dataset used for the second determination and a determination result;

wherein possible values of data classified into a quasi-identifier are divided into a plurality of categories; and wherein the method further comprises:

converting, based on information that defines relationships between data pieces representing the plurality of categories and data pieces included in the respective categories, the data pieces included in the respective categories into the data pieces representing the categories, and determining whether an individual is identified based on a dataset composed of a plurality of stream data pieces included in the converted data pieces.

* * * * *

UNITED STATES PATENT AND TRADEMARK OFFICE
CERTIFICATE OF CORRECTION

PATENT NO.         : 9,959,427 B2
APPLICATION NO.    : 15/114616
DATED              : May 1, 2018
INVENTOR(S)        : Sawako Mikami et al.

It is certified that error appears in the above-identified patent and that said Letters Patent is hereby corrected as shown below:

On the Title Page

Delete "(22) PCT Filed: Apr. 14, 2015"
Insert --(22) PCT Filed: Jan. 14, 2015--

Signed and Sealed this
Tenth Day of July, 2018

Andrei Iancu
*Director of the United States Patent and Trademark Office*